United States Patent
Holmstrom et al.

(10) Patent No.: US 12,158,743 B2
(45) Date of Patent: Dec. 3, 2024

(54) METHOD FOR ESTABLISHING COMMUNICATION IN A MACHINE TOOL SYSTEM AND A COMMUNICATION APPARATUS THEREFOR

(71) Applicant: AB SANDVIK COROMANT, Sandviken (SE)

(72) Inventors: Tennerth Holmstrom, Bastad (SE); Anders Gabert, Sandviken (SE)

(73) Assignee: AB SANDVIK COROMANT, Sandviken (SE)

( * ) Notice: Subject to any disclaimer, the term of this patent is extended or adjusted under 35 U.S.C. 154(b) by 444 days.

(21) Appl. No.: 17/608,391

(22) PCT Filed: Apr. 2, 2020

(86) PCT No.: PCT/EP2020/059439
§ 371 (c)(1),
(2) Date: Nov. 2, 2021

(87) PCT Pub. No.: WO2020/224880
PCT Pub. Date: Nov. 12, 2020

(65) Prior Publication Data
US 2022/0091577 A1    Mar. 24, 2022

(30) Foreign Application Priority Data
May 3, 2019   (EP) .................................... 19172582

(51) Int. Cl.
G05B 19/408     (2006.01)
G05B 19/05      (2006.01)

(52) U.S. Cl.
CPC ......... *G05B 19/4083* (2013.01); *G05B 19/05* (2013.01); *G05B 2219/31101* (2013.01); *G05B 2219/31418* (2013.01)

(58) Field of Classification Search
None
See application file for complete search history.

(56) References Cited

U.S. PATENT DOCUMENTS 5,963,450 A * 10/1999 Dew ..................... H04L 41/022
                                                        700/169
6,101,545 A *  8/2000 Balcerowski ............ H04L 9/40
                                                        370/464

(Continued)

FOREIGN PATENT DOCUMENTS

JP      2002281111 A      9/2002
JP      2009194482 A      8/2009

(Continued)

*Primary Examiner* — David Earl Ogg
(74) *Attorney, Agent, or Firm* — Corinne R. Gorski

(57) ABSTRACT

A method for establishing communication between a control node and a machine in a machine tool system includes notifying the control node of an identifier of the machine. The machine includes a numerical control (NC). The method further includes the steps of retrieving a machine configuration file including machine attributes at the control node based on the identifier; determining a data structure of a data signal transferring information in the machine tool system by interpreting the machine configuration file; and acknowledging from the control node to the machine that communication has been established.

13 Claims, 13 Drawing Sheets

(56) References Cited

U.S. PATENT DOCUMENTS

| | | | | |
|---|---|---|---|---|
| 6,799,232 B1* | 9/2004 | Wang | ............... | G06F 12/04 |
| | | | | 710/24 |
| 2005/0172220 A1* | 8/2005 | Humphrey | ............... | G06F 40/12 |
| | | | | 715/234 |
| 2007/0007895 A1 | 4/2007 | Vangompel | | |
| 2010/0001785 A1 | 1/2010 | Takeishi | | |
| 2012/0254339 A1* | 10/2012 | Holmes | ............... | G05B 19/4185 |
| | | | | 709/212 |
| 2014/0358792 A1* | 12/2014 | Berke | ............... | G06Q 30/018 |
| | | | | 705/50 |
| 2016/0004610 A1* | 1/2016 | Knight | ............... | G06F 11/2028 |
| | | | | 714/4.11 |
| 2017/0149904 A1* | 5/2017 | Jonsson | ............... | H04L 67/125 |
| 2018/0067472 A1* | 3/2018 | Hashimoto | ............... | G05B 19/408 |
| 2018/0365423 A1* | 12/2018 | Poppe | ............... | G05B 19/00 |

FOREIGN PATENT DOCUMENTS

| | | |
|---|---|---|
| WO | 9961961 A1 | 12/1999 |
| WO | 2008127863 A2 | 10/2008 |

\* cited by examiner

METHOD FOR ESTABLISHING COMMUNICATION IN A MACHINE TOOL SYSTEM AND A COMMUNICATION APPARATUS THEREFOR

RELATED APPLICATION DATA

This application is a § 371 National Stage Application of PCT International Application No. PCT/EP2020/059439 filed Apr. 2, 2020 claiming priority to EP 19172582.9 filed May 3, 2019.

TECHNICAL FIELD

The present disclosure relates to a method for establishing communication in a machine tool system and to an apparatus for performing the method and a computer program for establishing communication in a machine tool system.

BACKGROUND

A machine tool is a machine for shaping or machining metal or other rigid materials such as plastics, composites, ceramics not limiting to other rigid materials, usually by cutting, boring, grinding, shearing, or other forms of processing. Machine tools employ some sort of tool that does the cutting or shaping. All machine tools have some means of constraining the workpiece and provide a guided movement of the parts of the machine. Thus the relative movement between the workpiece and the cutting tool is controlled or constrained by the machine to at least some extent.

Computer Numerical Control (CNC) is widely used for controlling machine tools made for manufacturing, both additive and subtractive, wherein operations such as drilling, milling, turning, reaming, threading or grinding are common A CNC machine alters materials, for example, metal, plastic, wood, ceramic, or composite etc. to meet precise specifications by following programmed instructions and without a manual operator. In general, a CNC comprises at least one Numerical Control (NC) that controls numerical programmed motions and one Programmable Logic Controller (PLC) controlling logical based functions.

Nowadays, in CNC systems, the design of a mechanical part and its manufacturing program is highly automated. The mechanical dimensions of the part are defined using CAD software, and then translated into manufacturing directives by Computer Aided Manufacturing (CAM) software. The resulting directives are transformed by "post processor" software into specific commands necessary for a particular machine to produce the component, and then loaded into the CNC machine. To summarize, CNC machines combine a motorized maneuverable tool and often a motorized maneuverable workpiece, which are both controlled by a NC, according to specific input instructions. Instructions are typically delivered to a CNC machine in a form of G-codes generated by a graphical Computer Aided Manufacturing (CAM) software, and executed in the NC as sequential programs.

To control the machine tools, a control node may be configured in such system. Nowadays, the establishment of communication between the control node and the machine depends much on specific manufacture of the machine. When any node in the communication is changed, the establishment of communication has to be changed according to the situation, which affects the efficiency of the system.

SUMMARY

It is an object of the invention to address at least some of the problems and issues outlined above. One object of the present disclosure is to provide a method and an apparatus for establishing communication in a machine tool system.

Another object is to provide a computer program product comprising computer-readable instructions which, when executed on a computer, performs a method for establishing communication in a machine tool system.

The above objectives are wholly or partially met by methods and apparatuses according to the appended claims. Features and aspects are set forth in the appended claims, in the following description, and in the annexed drawings of the present disclosure.

According to a first aspect, there is provided a method for establishing communication between a control node and a machine in a machine tool system, comprising the steps of notifying the control node of an identifier of the machine, said machine comprising a Numerical Control, NC; retrieving a machine configuration file comprising machine attributes at the control node based on the identifier; determining a data structure for a data signal transferring information in the machine tool system, by interpreting the machine configuration file; and acknowledging from the control node to the machine that communication has been established.

In an exemplary embodiment, the machine further comprises a Programmable Logic Controller, PLC.

In another exemplary embodiment, the identifier of the machine is generated based on which version of a PLC interface that is installed in the machine, the manufacturer ID and serial number of the machine.

In yet another exemplary embodiment, the configuration file comprises one sub element comprising metadata for the machine and one sub element comprising layout of the data signal.

In yet another exemplary embodiment, the configuration file comprises information indicating whether the data is sent in Big- or Little-endian byte order.

In yet another exemplary embodiment, the acknowledging of the communication is a ping command.

In yet another exemplary embodiment, the machine configuration file is an XML file.

According to a second aspect, there is provided an apparatus for establishing communication between a control node and a machine in a machine tool system, comprising a notifying unit configured to notify the control node of an identifier of the machine in the machine tool system, said machine comprising a Numerical Control, NC; a retrieving unit configured to retrieve a machine configuration file comprising machine attributes at the control node based on the identifier; a determining unit configured to determine a data structure for a data signal transferring information in the machine tool system, by interpreting the machine configuration file; and an acknowledging unit configured to acknowledge from the control node to the machine that the communication is established.

According to a third aspect, there is provided a computer program product comprising computer-readable instructions which, when executed on a computer, performs a method according to the above.

The present invention provides a unified interface for the establishment of communication between the control node and the machine tool system, thus reduces the complexity of configuration of the communication establishment. Another advantage is that the efficiency of the system has been significantly improved. Furthermore, an enhanced connectivity between the machine tool system and the control node is also provided, even a plug and play environment is possible for the end user.

BRIEF DESCRIPTION OF THE DRAWINGS

Several aspects of the disclosure can be better understood with reference to the following drawings. In the drawings, like reference numerals designate corresponding parts throughout the several views.

DETAILED DESCRIPTION

Figure 1:
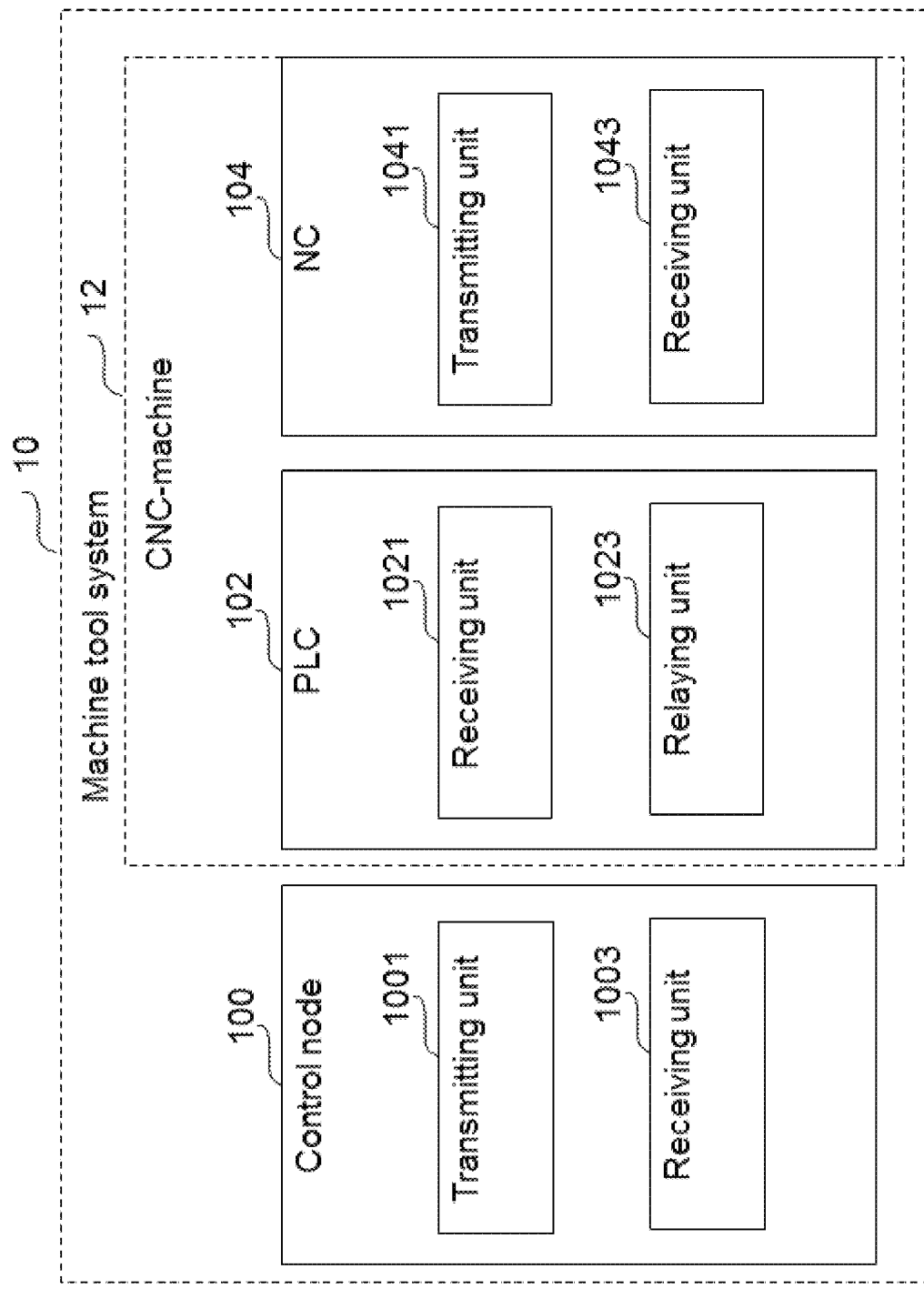
FIG. 1 is a block diagram illustrating an overview of the machine tool system.
Figure 2:
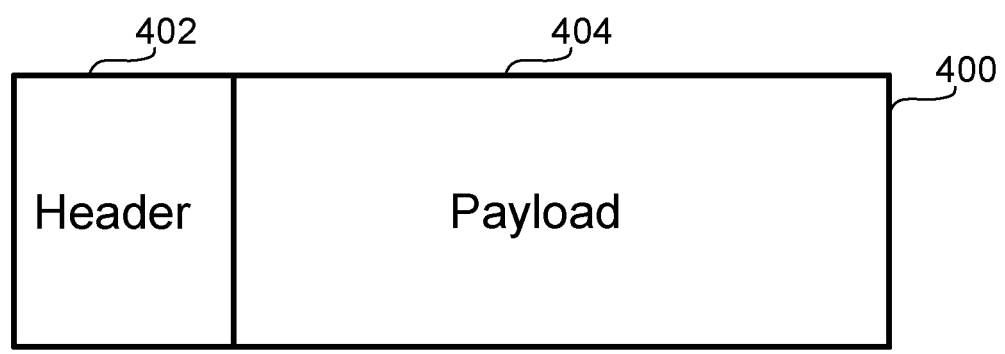
FIG. 2 illustrates an exemplary structure of a data signal.

FIG. 1 shows a non-limiting overview of a machine tool system 10, illustrating an exemplary embodiment. Machine tools may be milling machines, drilling machines and so on. Machine tools herein covers machines for both subtractive and additive manufacturing. The system 10 may comprise a control node 100, comprising a transmitting unit 1001 for transmitting data signals and a receiving unit 1003 for receiving data signals. The control node 100 can be physically located inside a local machine tool system or remotely connected to the local machine tool system. The control node 100 may be, for example, a local computer, a server, a central located server, a cloud-based server, a virtual computer, etc. The data signals may be any type of data packets, for example including a header and payload, which are suitable for transmitting information in the machine tool system 10, such as data packets based on Profibus, IEEE or TCP/IP etc. An exemplary structure of a data signal 400 is shown in FIG. 2 wherein a header 402 and a payload 404 are included in the data signal. The functions of the header and the payload are the same as conventional data packets, which will not be described in detail herein.

In FIG. 1 the machine tool system 10 may further comprise a CNC-machine 12, also called machine tool or machine in this disclosure hereafter. The machine may further comprise a Programmable Logic Controller (PLC) 102, comprising a receiving unit 1021 for reception of data signals and a relaying unit 1023 for relaying data signals and a Numeric Control (NC) 104 comprising a receiving unit 1041 for reception of data signals and a transmitting unit 1043 for transmitting data signals. The control node 100 is configured to exchange data signals with the machine to establish communication with the machine. The connection between the control node 100 and the machine tool system 10 may be a wired connection or a wireless connection. In different embodiments, the communication between the control node 100 and the machine tool system 10 may be based on Ethernet, according to IEEE 802.3, etc., or WiFi, according to 802.11, etc., Bluetooth, TCP/IP (Transfer Control Protocol/Internet/Protocol) not limiting to other suitable formats.

Figure 3:
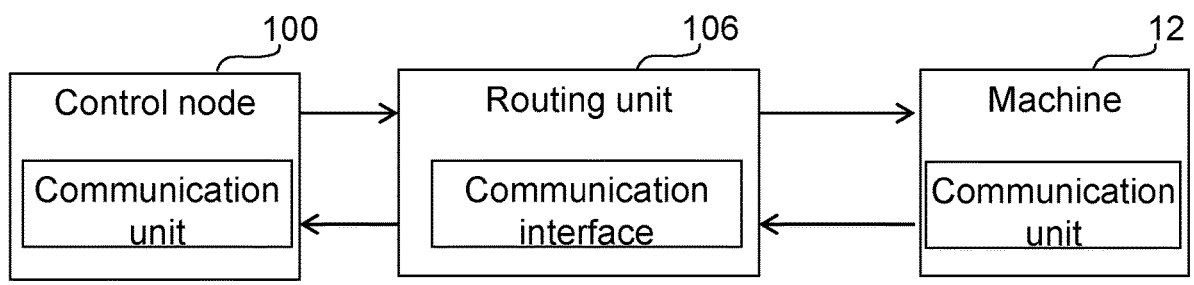
FIG. 3 illustrates the communication between the control node and the machine tool system.

FIG. 3 shows an exemplary communication between the control node 100 and the machine 12 in the machine tool system 10. The communication between the control node 100 and the machine 12 is bi-directional. Data signals sent between the control node 100 and the machine 12 are relayed over a routing unit 106. The routing unit 106 may be any type of device having the function of routing, such as a PLC, a router, a device comprising machine tool relay etc. In the present disclosure, PLC is used as an example for relaying the data signals. The control node 100 and the machine tool system 10 respectively has a communication unit for communicating with each other. The routing unit 106 has a communication interface for relaying data between the control node 100 and the NC 104. The communication between the control node 100 and the machine tool system 10 is established according to a method, which will be described in detail as follows. Other alternatives for the communication between the control node 100 and the machine 12 can also be adopted according to specific requirements and environments in this disclosure. For example, the control node 100 and the machine 12 can communicate directly without a routing unit 106 if the routing unit 106 is not necessary.

Figure 4:
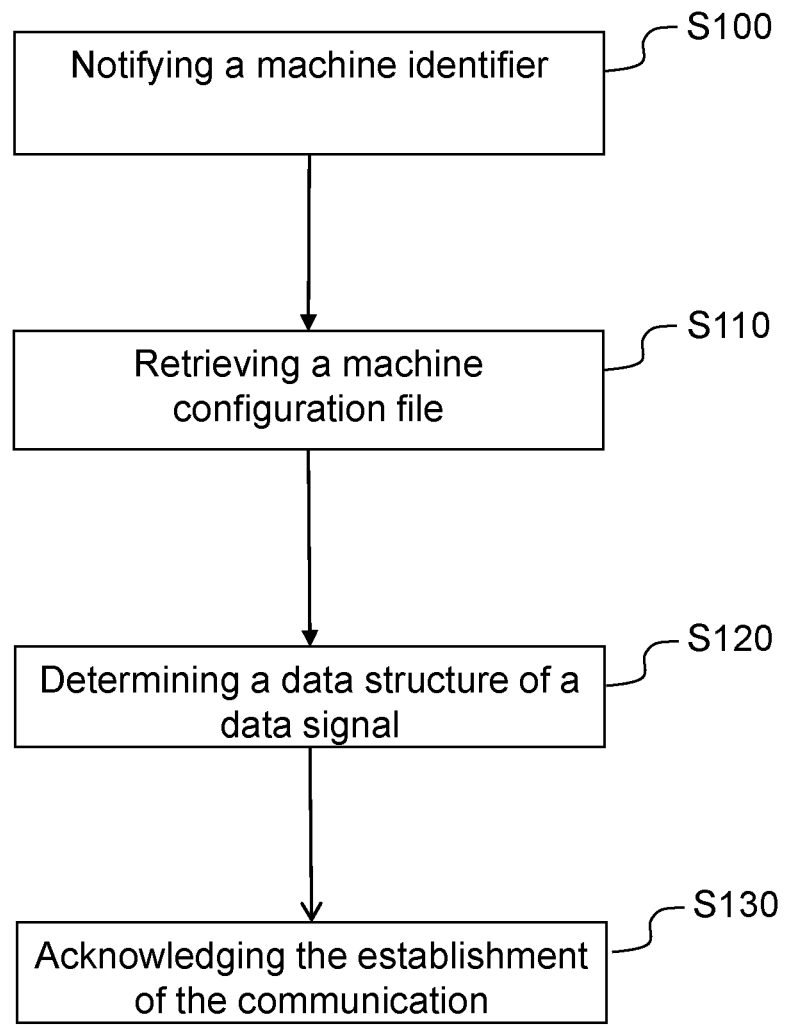
FIG. 4 shows an exemplary flowchart of establishing communication between the control node and the machine tool system.

The communication between the control node 100 and the machine 12 is established by the process flow shown in FIG. 4. At S100, the machine tool system 10 notifies the control node 100 of an identifier of a machine 12 in the machine tool system 10, said machine comprising a PLC 102 and a NC 104; then the control node 100 retrieves a machine configuration file comprising machine attributes based on the identifier at S110; at S120 the control node 100 determines a data structure for a data signal 400 transferring information in the machine tool system 10, by interpreting the machine configuration file; and acknowledging from the control node 100 to the machine 12 that communication has been established at S130. In one embodiment, a ping command is required between the control node 100 and the machine 12, preferably between the control node 100 and the PLC 102, to make sure that the communication link is up and running. To detect if there is a communication error, a ping may be sent to the machine with a configurable time interval, it is only sent if there is no other PLC interface activity within this time interval. The ping may also be sent as a PLC ACK data signal to the PLC with a listed action type. The PLC 104 may send back an acknowledge with the same action type as soon as it detects a ping. Furthermore, data signals for a machine are defined by the number of tool carriers that can operate in the machine. Each tool carrier is defined as a channel. In some embodiments, the ping is only sent on the first channel in the machine data signal layout.

It may be different types of data signals exchanged over the communication interface. The data signals may be divided into classes by their use and characteristics. Some data signals may work as pure information carriers which in this disclosure will be called real-time data signal, such as a spindle speed, while others may have a clear and dedicated task which in this disclosure will be called action data signals. In various embodiments, action data signals may be used to start a process on either the PLC 102, NC 104 or the control node 100. The data signal class specification may also indicate the direction of a data signal which makes it possible to differentiate between inputs (to machine) and outputs (from machine) even though they basically deal with the same thing.

The data signal layout of the machine mentioned herein includes both data signals that are transmitted from the machine and data signals that are received by the machine. It should be understood that the specifications are non-limiting exemplifying embodiments, which are possible to be adapted by the person skilled in the art. For each kinematic feature of the machine, a subset of data signals is defined, the data signals are then mapped into memory areas in the machine control system. When defining the data signals for a machine, the kinematic is divided into the following data signal categories: machine identification, acknowledgement ACK actions, Not acknowledgement ACK actions, cutting tool feed rate, axis position and speed, axis load/power/torque and multiplicators for feed rate and spindle speed.

In an exemplifying embodiment, the action data signals and some real-time data signals for a machine are defined by the number of tool carriers that can operate in the machine. Each tool carrier is defined as a channel which has a corresponding set of data signals. Some real-time data signals are defined by the number of axes of the machine. Each axis has a corresponding set of data signals, one of each relevant real-time data signal per axis. The data signal of Machine identification is shown in Table 1.

TABLE 1

List of machine identification data signals from the machine

| Data signal | Class | Description |
| --- | --- | --- |
| FrMachInfo01 | Real-time from Machine | Contains the PLC interface version, the manufacturer ID and the machine ID. |
| FrMachInfo02 | Real-time from Machine | |

In an embodiment, the first two data signals in the machine data signal layout forms a unique serial number for each machine. The machine identification data signals may contain an interface version, a reserved area for future use, a manufacturer ID and a machine ID. The interface version may be one byte and it is in this embodiment used by the control node 100 to identify which version of the PLC interface that is installed in the machine. The reserved area for future use is bits set to 0 in this version of the PLC interface. Manufacturer ID is two bytes and it is the serial number for the machine tool manufacturer. Machine ID is four bytes and it is the serial number for the specific machine. See Table 2 for information about what information each byte contains in the machine identification data signals.

TABLE 2

Machine serial number information

| Data signal | Byte 0 | Byte 1 | Byte 2 | Byte 3 |
| --- | --- | --- | --- | --- |
| FrMachInfo01 | Interface version | Reserved (0) | Manufacturer ID | Manufacturer ID |
| FrMachInfo02 | Machine ID | Machine ID | Machine ID | Machine ID |

The serial number may be required to be sent serially in big endian byte order over the PLC interface with the bits representing PLC interface version to be sent first. Different machine control systems can store the data signals in its memory in different byte orders, the machine tool manufacturer is responsible for sending the serial number in the correct manner over the PLC interface.

The machine data signal layout and metadata for the machine are gathered in a machine configuration file. The machine configuration file can be located anywhere according to users' need. For example, it is located on the control node 100, or in a database or any other storage suitable for storing configuration files.

For the control node 100 and the PLC 102 to correctly process the data signals sent back and forth it is advantageous if the machine configuration file includes information of which byte order the PLC 102 uses to send and receive data signals. Based on this information the data signals sent over the PLC interface will be translated to and from the machine. See Table 3 for the supported byte orders, big endian is the preferred byte order. The machine identification data signals are always required to be sent with big endian byte order, regardless of which byte order is used in the PLC 102.

TABLE 3

List of supported byte endianness. Both hexadecimal values represent the same decimal value.

| Memory address | n | n + 1 | n + 2 | n + 3 |
| --- | --- | --- | --- | --- |
| Big endian | 0x0A | 0x0B | 0x0C | 0x0D |
| Little endian | 0x0D | 0x0C | 0x0B | 0x0A |

Real-time values are advantageously sent as raw values which may be converted to International System of Units, SI-units. The conversion may be done by using the equation of a straight line ($y=mx+b$). The gradient (m) and the intercept (b) may be set in the machine configuration.

In a non-limiting embodiment, information about the machine and its data signal layout may be included in the machine configuration file. The machine configuration file may be stored somewhere outside the PLC or locally on the PLC after being generated by a machine configuration tool. The machine configuration file can be written in any markup language, such as XML, HTML etc., in the present disclosure, the machine configuration file is written in XML as an exemplifying embodiment and it contains two main elements as seen in the example below. The two main elements may be machine data and signal layout.

```
<?xml version="1.0"?>
<Configuration xmlns:xsi="http://www.w3.org/2001/XMLSchema-instance"
xmlns:xsd="http://www.w3.org/2001/XMLSchema"
SavedDate="2018-08-23T07:29:03.9608405+02:00">
  <MachineData>
  </MachineData>
```

```
<SignalLayout>
</SignalLayout>
</Configuration>
```

TABLE 4 example of the machine configuration file

| Element | Description |
|---|---|
| XML version | XML version. |
| Configuration | Element containing the machine data and data signal layout. |
| SavedData | Timestamp of the latest edit of the machine configuration file. |
| MachineData | Contains metadata about the machine. |
| SignalLayout | Contains the machine data signal layout and configuration. |

The "MachineData" element may include child elements with metadata for the machine, as seen in the example below.

```
<MachineData>
    <InterfaceVersion>1</InterfaceVersion>
    <ManufacturerId>123</ManufacturerId>
    <ManufacturerName>ABC</ManufacturerName>
    <ManufacturingCountryCode>DE</ManufacturingCountryCode>
    <ModelNumber>MN123</ModelNumber>
    <PartNumber>PN123</PartNumber>
    <SerialNumber>SN123</SerialNumber>
    <ConstructionDate>2018-08-22T00:00:00+02:00</ConstructionDate>
    <ByteOrder description="Little_endian">1</ByteOrder>
</MachineData>
```

TABLE 5

Configuration of MachineData

| Element | Description |
|---|---|
| Interface Version | Version number of the PLC interface. |
| ManufacturerId | Manufacturer ID number. |
| ManufacturerName | Name of the manufacturer. |
| ManufacturingCountlyCode | Machine manufacturing country code. |
| ModelNumber | Machine model number. |
| PartNumber | Machine part number. |
| SerialNumber | Machine serial number. |
| ConstructionDate | Timestamp of the machine construction date. |
| ByteOrder | Byte order of data sent from the machine Allowed parameters of this element: 0 = Big endian 1 = Little endian |

The data signal layout element may contain all child elements corresponding to the machine data signal layout, as seen in the non-limiting example below. Each element contains child elements with information about each data signal in the machine configuration.

```
<SignalLayout>
    <FromMachineInformationConfiguration>           </FromMachineInformationConfiguration>
    <FromMachineAcknowledgedActionConfigurations>   </FromMachineAcknowledgedActionConfigurations>
    <ToMachineAcknowledgedActionConfigurations>     </ToMachineAcknowledgedActionConfigurations>
    <ToMachineFeedMultiplierConfigurations>         </ToMachineFeedMultiplierConfigurations>
    <FromMachineActionConfigurations>               </FromMachineActionConfigurations>
    <ToMachineActionConfigurations>                 </ToMachineActionConfigurations>
    <ToMachineSpeedMultiplierConfigurations>        </ToMachineSpeedMultiplierConfigurations>
    <FromMachineActualFeedConfigurations>           </FromMachineActualFeedConfigurations>
    <FromMachineActualPositionOrSpeedConfigurations> </FromMachineActualPositionOrSpeedConfigurations>
    <FromMachineActualLPTConfigurations>            </FromMachineActualLPTConfigurations>
</SignalLayout>
```

TABLE 6

Configuration of data signal layout

| Element | Description |
|---|---|
| FromMachineinformationConfiguration | Configuration of the machine information data signals. |
| FromMachineAcknowledgedActionConfigurations | Configurations for ACK action data signals from the machine. |
| ToMachineAcknowledgedActionConfigurations | Configurations for ACK action data signals to the machine. |
| ToMachineFeedMultiplierConfigurations | Configurations for the multiplicator to the actual tool tip feed rates. |
| FromMachineActionConfigurations | Configurations for Not ACK action data signals from the machine. |
| ToMachineActionConfigurations | Configurations for Not ACK action data signals to the machine. |
| ToMachineSpeedMultiplierConfigurations | Configurations for the multiplicator to the actual speed of spindles. |
| FromMachineActualFeedConfigurations | Configurations for the actual tool tip feed rates from the machine. |
| FromMachineActualPositionOrSpeedConfigurations | Configurations for the actual linear or rotary position and/or speed of axes. |
| FromMachineActualLPTConfigurations | Configurations for the load, power or torque for motors driving an axis. |

Further non-limiting examples of the above machine data configuration are shown below.

The "FromMachineInformationConfiguration" element may include child elements with information about the machine information data signals, as seen in the example below.

```
<FromMachineInformationConfiguration>
    <Description>Description</Description>
    <Index>1</Index>
    <MachineId>123</MachineId>
    <Name>FromMachineInformation</Name>
    <MemoryOffset>0</MemoryOffset>
</FromMachineInformationConfiguration>
```

TABLE 7

Configuration of machine information

| Element | Description |
| --- | --- |
| Description | Description of the machine information. |
| Index | Machine identification index. Allowed parameters of this element: 1 |
| MachineId | Machine identification number. |
| Name | Name of the data signal. |
| MemoryOffset | Memory address offset to the first byte of the machine information data signal. |

The "FromMachineAcknowledgedActionConfigurations" element may include one child element for each channel, as seen in the example below.

```
<FromMachineAcknowledgedActionConfigurations>
    <FromMachineAcknowledgedActionConfiguration>
        <Description>Description</Description>
        <Index>1</Index>
        <Name>FromMachineAcknowledgedAction (1)</Name>
        <TypeMemoryOffset>12</TypeMemoryOffset>
        <ValueMemoryOffset>16</ValueMemoryOffset>
        <AckMemoryOffset>0</AckMemoryOffset>
    </FromMachineAcknowledgedActionConfiguration>
    <FromMachineAcknowledgedActionConfiguration>
        <Description>Description</Description>
        <Index>2</Index>
        <Name>FromMachineAcknowledgedAction (2)</Name>
        <TypeMemoryOffset>32</TypeMemoryOffset>
        <ValueMemoryOffset>36</ValueMemoryOffset>
        <AckMemoryOffset>28</AckMemoryOffset>
    </FromMachineAcknowledgedActionConfiguration>
</FromMachineAcknowledgedActionConfigurations>
```

TABLE 8

Configuration of acknowledgement action from the machine

| Element | Description |
| --- | --- |
| Description | Description of the acknowledged action from the machine configuration. |
| Index | From machine acknowledged action configuration index. Allowed parameters of this element (positive integers): 1 = Channel 1 2 = Channel 2 . . . n = Channel n |
| Name | Name of the acknowledged action from the machine configuration. |
| TypeMemoryOffset | Memory address offset to the first byte of the action type data signal. |
| ValueMemoryOffset | Memory address offset to the first byte of the action value data signal. |
| AckMemoryOffset | Memory address offset to the first byte of the action ACK data signal. |

The "ToMachineAcknowledgedActionConfigurations" element may include one child element for each channel, as seen in the example below.

```
<ToMachineAcknowledgedActionConfigurations>
    <ToMachineAcknowledgedActionConfiguration>
        <Description>Description</Description>
        <Index>1</Index>
        <Name>ToMachineAcknowledgedAction (1)</Name>
        <TypeMemoryOffset>4</TypeMemoryOffset>
        <ValueMemoryOffset>8</ValueMemoryOffset>
        <AckMemoryOffset>8</AckMemoryOffset>
    </ToMachineAcknowledgedActionConfiguration>
    <ToMachineAcknowledgedActionConfiguration>
        <Description>Description</Description>
        <Index>2</Index>
        <Name>ToMachineAcknowledgedAction (2)</Name>
        <TypeMemoryOffset>32</TypeMemoryOffset>
        <ValueMemoryOffset>36</ValueMemoryOffset>
        <AckMemoryOffset>28</AckMemoryOffset>
    </ToMachineAcknowledgedActionConfiguration>
</ToMachineAcknowledgedActionConfigurations>
```

TABLE 9

Configuration of acknowledgement action to the machine

| Element | Description |
| --- | --- |
| Description | Description of the acknowledged action to the machine configuration. |
| Index | To machine acknowledge action configuration index. Allowed parameters of this element (positive integers): 1 = Channel 1 2 = Channel 2 . . . n = Channel n |
| Name | Name of the acknowledged action to the machine configuration. |
| TypeMemoryOffset | Memory address offset to the first byte of the action type data signal. |
| ValueMemoryOffset | Memory address offset to the first byte of the action value data signal. |
| AckMemoryOffset | Memory address offset to the first byte of the action ACK data signal. |

The "ToMachineFeedMultiplicatorConfigurations" element may include one child element for each channel, as seen in the example below.

```
<ToMachineFeedMultiplicatorConfigurations>
    <ToMachineFeedMultiplicatorConfiguration>
        <Description>Description</Description>
        <Index>1</Index>
        <Name>ToMachineFeedMultiplicator (1)</Name>
        <MemoryOffset>20</MemoryOffset>
        <ScaleFactor>100</ScaleFactor>
```

-continued

```
        <MinValue>0</MinValue>
        <MaxValue>100</MaxValue>
    </ToMachineFeedMultiplicatorConfiguration>
    <ToMachineFeedMultiplicatorConfiguration>
        <Description>Description</Description>
        <Index>2</Index>
        <Name>ToMachineFeedMultiplicator (2)</Name>
        <MemoryOffset>48</MemoryOffset>
        <ScaleFactor>100</ScaleFactor>
        <MinValue>0</MinValue>
        <MaxValue>100</MaxValue>
    </ToMachineFeedMultiplicatorConfiguration>
</ToMachineFeedMultiplicatorConfigurations>
```

TABLE 10

Configuration of the feed rate multiplicator

| Element | Description |
|---|---|
| Description | Description of the feed rate multiplicator configuration. |
| Index | Feed rate multiplicator configuration index. Allowed parameters of this element (positive integers):<br>1 = Channel 1<br>2 = Channel 2<br>. . .<br>n = Channel n |
| Name | Name of the feed rate multiplicator configuration. |
| MemoryOffset | Memory address offset to the first byte of the data signal. |
| ScaleFactor | The multiplicator is scaled from a decimal value to an integer value using this scale factor. |
| MinValue | Multiplicator minimum value. |
| MaxValue | Multiplicator maximum value. |

The "FromMachineActionConfigurations" element may include one child element for each channel, as seen in the example below.

```
<FromMachineActionConfigurations>
    <FromMachineActionConfiguration>
        <Description>Description</Description>
        <Index>1</Index>
        <Name>FromMachineAction (1)</Name>
        <TypeMemoryOffset>20</TypeMemoryOffset>
        <ValueMemoryOffset>24</ValueMemoryOffset>
    </FromMachineActionConfiguration>
    <FromMachineActionConfiguration>
        <Description>Description</Description>
        <Index>2</Index>
        <Name>FromMachineAction (2)</Name>
        <TypeMemoryOffset>40</TypeMemoryOffset>
        <ValueMemoryOffset>44</ValueMemoryOffset>
    </FromMachineActionConfiguration>
</FromMachineActionConfigurations>
```

TABLE 11

Configuration of the action from the machine

| Element | Description |
|---|---|
| Description | Description of the action from the machine configuration. |
| Index | From machine action configuration index. Allowed parameters of this element (positive integers):<br>1 = Channel 1<br>2 = Channel 2<br>. . .<br>n = Channel n |
| Name | Name of the action from the machine configuration. |
| TypeMemoryOffset | Memory address offset to the first byte of the action type data signal. |
| ValueMemoryOffset | Memory address offset to the first byte of the action value data signal. |

The "ToMachineActionConfigurations" element may include one child element for each channel, as seen in the example below.

```
<ToMachineActionConfigurations>
    <ToMachineActionConfiguration>
        <Description>Description</Description>
        <Index>1</Index>
        <Name>ToMachineAction (1)</Name>
        <TypeMemoryOffset>12</TypeMemoryOffset>
        <ValueMemoryOffset>16</ValueMemoryOffset>
    </ToMachineActionConfiguration>
    <ToMachineActionConfiguration>
        <Description>Description</Description>
        <Index>2</Index>
        <Name>ToMachineAction (2)</Name>
        <TypeMemoryOffset>40</TypeMemoryOffset>
        <ValueMemoryOffset>44</ValueMemoryOffset>
    </ToMachineActionConfiguration>
</ToMachineActionConfigurations>
```

TABLE 12

Configuration of the action to the machine

| Element | Description |
|---|---|
| Description | Description of the action to the machine configuration. |
| Index | To machine action configuration index. Allowed parameters of this element (positive integers):<br>1 = Channel 1<br>2 = Channel 2<br>. . .<br>n = Channel n |
| Name | Name of the action to the machine configuration. |
| TypeMemoryOffset | Memory address offset to the first byte of the action type data signal. |
| ValueMemoryOffset | Memory address offset to the first byte of the action value data signal. |

The "ToMachineSpeedMultiplicatorConfigurations" element may include one child element for each spindle, as seen in the example below.

```
<ToMachineSpeedMultiplicatorConfigurations>
    <ToMachineSpeedMultiplicatorConfiguration>
        <Description>Description</Description>
        <Index>1</Index>
        <Name>ToMachineSpeedMultiplicator (1)</Name>
        <PhysicalName>S1</PhysicalName>
        <MemoryOffset>24</MemoryOffset>
        <ScaleFactor>100</ScaleFactor>
        <MinValue>0</MinValue>
        <MaxValue>100</MaxValue>
    </ToMachineSpeedMultiplierConfiguration>
    <ToMachineSpeedMultiplierConfiguration>
        <Description>Description</Description>
        <Index>2</Index>
        <Name>ToMachineSpeedMultiplicator (2)</Name>
        <PhysicalName>S2</PhysicalName>
```

```
        <MemoryOffset>52</MemoryOffset>
        <ScaleFactor>100</ScaleFactor>
        <MinValue>0</MinValue>
        <MaxValue>100</MaxValue>
      </ToMachineSpeedMultiplierConfiguration>
</ToMachineSpeedMultiplierConfigurations>
```

TABLE 13

Configuration of the spindle speed multiplicator

| Element | Description |
| --- | --- |
| Description | Description of the spindle speed multiplicator. |
| Index | Spindle speed multiplicator configuration index. Allowed parameters of this element (positive integers):<br>1 = Spindle 1<br>2 = Spindle 2<br>...<br>n = Spindle n |
| Name | Name of the spindle speed multiplicator. |
| PhysicalName | Name of the spindle in the machine. |
| MemoryOffset | Memory address offset to the first byte of the data signal. |
| ScaleFactor | The multiplicator is scaled from a decimal value to an integer value using this scale factor. |
| MinValue | Multiplicator minimum value. |
| MaxValue | Multiplicator maximum value. |

The "FromMachineActualFeedConfigurations" element may include one child element for each channel, as seen in the example below.

```
<FromMachineActualFeedConfigurations>
   <FromMachineActualFeedConfiguration>
      <Description>Description</Description>
      <Index>1</Index>
      <Name>FromMachineActualFeed (1)</Name>
      <MemoryOffset>48</MemoryOffset>
      <ScalingGradient>1</ScalingGradient>
      <ScalingIntercept>0</ScalingIntercept>
      <MinValue>0</MinValue>
      <MaxValue>100</MaxValue>
   </FromMachineActualFeedConfiguration>
   <FromMachineActualFeedConfiguration>
      <Description>Description</Description>
      <Index>2</Index>
      <Name>FromMachineActualFeed (2)</Name>
      <MemoryOffset>52</MemoryOffset>
      <ScalingGradient>1</ScalingGradient>
      <ScalingIntercept>0</ScalingIntercept>
      <MinValue>0</MinValue>
      <MaxValue>100</MaxValue>
   </FromMachineActualFeedConfiguration>
</FromMachineActualFeedConfigurations>
```

TABLE 14

Configuration of the actual feed rate

| Element | Description |
| --- | --- |
| Description | Description of the actual feed rate configuration. |
| Index | Feed rate configuration index. Allowed parameters of this element (positive integers):<br>1 = Channel 1<br>2 = Channel 2<br>...<br>n = Channel n |
| Name | Name of the feed rate configuration. |
| MemoryOffset | Memory address offset to the first byte of the data signal. |
| ScalingGradient | Gradient value for scaling raw output to a relevant SI unit. |
| ScalingIntercept | Intercept value for scaling raw output to a relevant SI unit. |
| MinValue | Machine minimum feed rate value. |
| MaxValue | Machine maximum feed rate value. |

The "FromMachineActualPositionOrSpeedConfigurations" element may include one child element for each axis, as seen in the example below.

```
<FromMachineActualPositionOrSpeedConfigurations>
   <FromMachineActualPositionOrSpeedConfiguration>
      <Description>Position in machine axis C and speed in machine spindle S</Description>
      <Index>1</Index>
      <Name>FromMachineActualPositionOrSpeedAxis01</Name>
      <PhysicalName>C/S</PhysicalName>
      <MemoryOffset>20</MemoryOffset>
      <Type description="Rotary">1</Type>
      <OutputMode description="Dual">2</OutputMode>
      <Position>
         <ScalingGradient>1</ScalingGradient>
         <ScalingIntercept>0</ScalingIntercept>
         <MinValue>0</MinValue>
         <MaxValue>200</MaxValue>
      </Position>
      <Speed>
         <ScalingGradient>1</ScalingGradient>
         <ScalingIntercept>0</ScalingIntercept>
         <MinValue>0</MinValue>
         <MaxValue>200</MaxValue>
      </Speed>
   </FromMachineActualPositionOrSpeedConfiguration>
</FromMachineActualPositionOrSpeedConfigurations>
```

TABLE 15

Configuration of the actual position or speed

| Element | Description |
| --- | --- |
| Description | Description of the actual position or speed configuration. |
| Index | Axis position or speed configuration index. Allowed parameters of this element (positive integers):<br>1 = Axis 1<br>2 = Axis 2<br>. . .<br>n = Axis n |
| Name | Name of the data signal |
| PhysicalName | Name of the axis/spindle in the machine |
| MemoryOffset | Memory address offset to the first byte of the data signal |
| Type | Configuration of the axis<br>Allowed parameters of this element (positive integers):<br>0 = Linear<br>1 = Rotary |
| OutputMode | Configuration of the output mode from this data signal<br>Allowed parameters of this element (positive integers):<br>0 = Position<br>1 = Speed<br>2 = Dual |
| Position | Element containing information specific for Position mode. |
| Speed | Element containing information specific for Speed mode. |
| ScalingGradient | Gain value for scaling raw output to a relevant SI unit. |
| ScalingIntercept | Intercept value for scaling raw output to a relevant SI unit. |
| MinValue | Machine minimum value. |
| MaxValue | Machine maximum value. |

The "FromMachineActualLPTConfigurations" element may include one child element for each motor driving the machine axes, as seen in the example below.

```
<FromMachineActualLPTConfigurations>
    <FromMachineActualLPTConfiguration>
        <Description>Description</Description>
        <Index>1</Index>
        <Name>FromMachineActualLPT (1)M(1)</Name>
        <PhysicalName>X</PhysicalName>
        <MemoryOffset>84</MemoryOffset>
        <ScalingGradient>1</ScalingGradient>
        <ScalingIntercept>0</ScalingIntercept>
        <OutputMode description="Load">0</OutputMode>
        <MotorIndex>1</MotorIndex>
        <MinValue>0</MinValue>
        <MaxValue>100</MaxValue>
    </FromMachineActualLPTConfiguration>
    <FromMachineActualLPTConfiguration>
        <Description>Description</Description>
        <Index>2</Index>
        <Name>FromMachineActualLPT (2)M(1)</Name>
        <PhysicalName>Y</PhysicalName>
        <MemoryOffset>88</MemoryOffset>
        <ScalingGradient>1</ScalingGradient>
        <ScalingIntercept>0</ScalingIntercept>
        <OutputMode description="Load">0</OutputMode>
        <MotorIndex>1</MotorIndex>
        <MinValue>0</MinValue>
        <MaxValue>100</MaxValue>
    </FromMachineActualLPTConfiguration>
    <FromMachineActualLPTConfiguration>
        <Description>Description</Description>
        <Index>2</Index>
        <Name>FromMachineActualLPT (2) M(2)</Name>
        <PhysicalName>Y</PhysicalName>
        <MemoryOffset>92</MemoryOffset>
        <ScalingGradient>1</ScalingGradient>
        <ScalingIntercept>0</ScalingIntercept>
        <OutputMode description="Load">0</OutputMode>
        <MotorIndex>2</MotorIndex>
        <MinValue>0</MinValue>
        <MaxValue>100</MaxValue>
    </FromMachineActualLPTConfiguration>
</FromMachineActualLPTConfigurations>
```

TABLE 16

Configuration of the machine actual LPT

| Element | Description |
| --- | --- |
| Description | Description of the machine actual LPT configuration. |
| Index | Machine axis motor drive configuration index.<br>Allowed parameters of this element (positive integers):<br>1 = Axis 1<br>2 = Axis 2<br>. . .<br>n = Axis n |
| Name | Name of the machine actual LPT configuration. |
| PhysicalName | Name of the axis/spindle in the machine. |
| MemoryOffset | Memory address offset to the first byte of the data signal. |
| ScalingGradient | Gradient value for scaling raw output to a relevant SI unit. |
| ScalingIntercept | Intercept value for scaling raw output to a relevant SI unit. |
| OutputMode | Configuration of the output mode from this data signal.<br>Allowed parameters of this element:<br>0 = Load<br>1 = Power<br>2 = Torque |
| MotorIndex | Motor index of a machine axis.<br>Allowed parameters of this element:<br>1 = Motor 1<br>2 = Motor 2<br>. . .<br>n = Motor n |
| MinValue | Machine minimum LPT value. |
| MaxValue | Machine maximum LPT value. |

Figure 5:
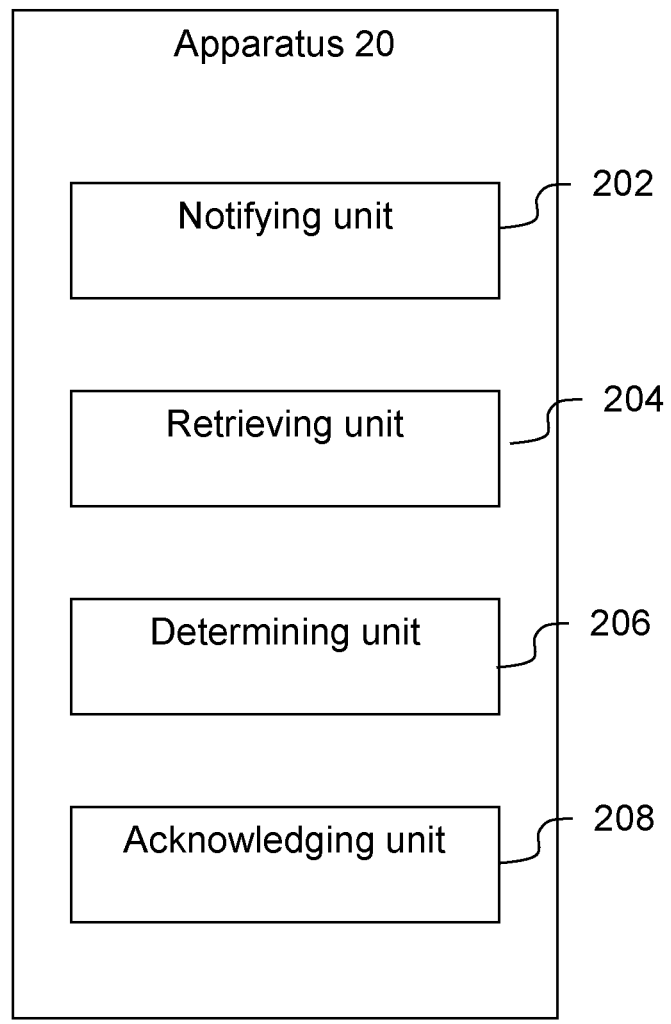
FIG. 5 illustrates an exemplary apparatus in accordance with the method of establishing communication shown in FIG. 3.

Turning to FIG. 5 now, illustrating an embodiment where an apparatus 20 implementing the establishment of communication is shown. The apparatus 20 includes a notifying unit 202 configured to notify the control node of an identifier of a machine in the machine tool system 10, said machine comprising a PLC 102 and a NC 104; a retrieving unit 204 configured to retrieve a machine configuration file comprising machine attributes at the control node 100 based on the identifier; a determining unit 206 configured to determine a data structure for a data signal transmitting information in the machine tool system 10, by interpreting the machine configuration file; and an acknowledging unit 208 configured to acknowledge from the control node to the machine that the communication is established.

Figure 6:
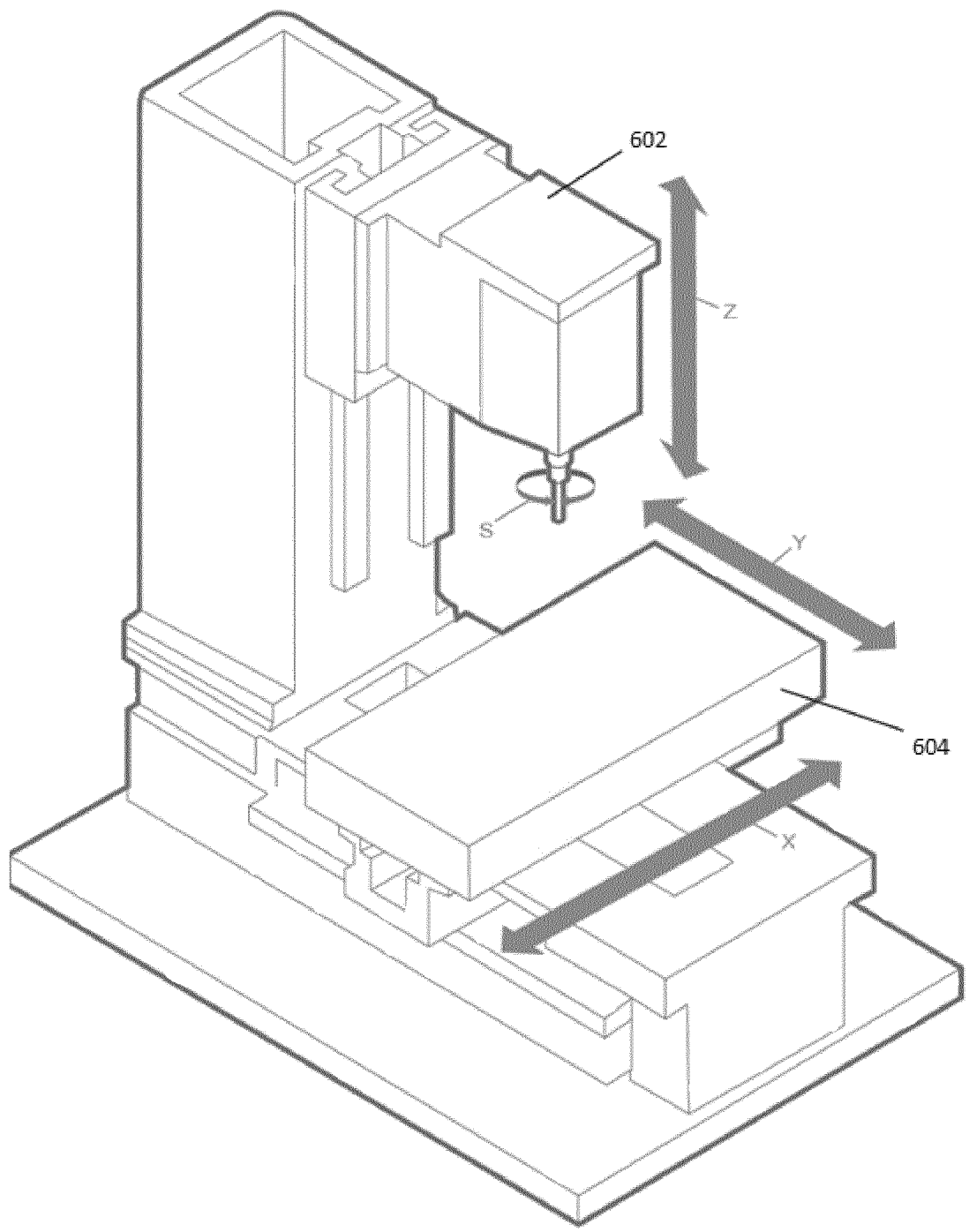
FIG. 6 illustrates an example of 3-axis vertical milling machine.

FIG. 6 illustrates an example of a 3-axis vertical milling machine, wherein 602 is a tool spindle and 604 is a workpiece. An example of a data signal layout for the 3-axis vertical milling machine is also shown in Table 17-18. The kinematic structure of this machine includes a workpiece with two linear axes (X, Y) and a spindle (S) with one linear axis (Z). This example machine outputs feed load [%].

TABLE 17

Layout of data signals from a 3-axis vertical milling machine

| Address offset | Data signal name | Description |
| --- | --- | --- |
| n + [00 . . . 03] | FrMachInfo01 | Machine information |
| n + [04 . . . 07] | FrMachInfo02 | |
| n + [08 . . . 11] | FrMachAck01 | ACK action acknowledge from machine: Channel 1 |
| n + [12 . . . 15] | FrMachAckType01 | ACK action type from machine: Channel 1 |
| n + [16 . . . 19] | FrMachAckValue01 | ACK action value from machine: Channel 1 |
| n + [20 . . . 23] | FrMachType01 | Not ACK action type from machine: Channel 1 |
| n + [24 . . . 27] | FrMachValue01 | Not ACK action value from machine: Channel 1 |
| n + [28 . . . 31] | FrMachFeed01 | Actual cutting feed rate: Channel 1 |
| n + [32 . . . 35] | FrMachPosSpe01 | Position: Axis X |
| n + [36 . . . 39] | FrMachPosSpe02 | Position: Axis Y |
| n + [40 . . . 43] | FrMachPosSpe03 | Position: Axis Z |
| n + [44 . . . 47] | FrMachPosSpe04 | Speed: Spindle S |
| n + [48 . . . 51] | FrMachLPT01M01 | Feed load: Axis X, Motor 1 |
| n + [52 . . . 55] | FrMachLPT02M01 | Feed load: Axis Y, Motor 1 |
| n + [56 . . . 59] | FrMachLPT03M01 | Feed load: Axis Z, Motor 1 |
| n + [60 . . . 63] | FrMachLPT04M01 | Feed load: Spindle S, Motor 1 |

TABLE 18

Layout of data signals to a 3-axis vertical milling machine

| Address offset | Data signal name | Description |
| --- | --- | --- |
| n + [00 . . . 03] | ToMachAck01 | ACK action acknowledge to machine: Channel 1 |
| n + [04 . . . 07] | ToMachAckType01 | ACK action type to machine: Channel 1 |
| n + [08 . . . 11] | ToMachAckValue01 | ACK action value to machine: Channel 1 |
| n + [12 . . . 15] | ToMachType01 | Not ACK Action type to machine: Channel 1 |
| n + [16 . . . 19] | ToMachValue01 | Not ACK Action value to machine: Channel 1 |
| n + [20 . . . 23] | ToMachFeedMul01 | Multiplicator cutting feed rate: Channel 1 |
| n + [24 . . . 27] | ToMachSpeedMul01 | Multiplicator spindle speed: Spindle S |

Figure 7:
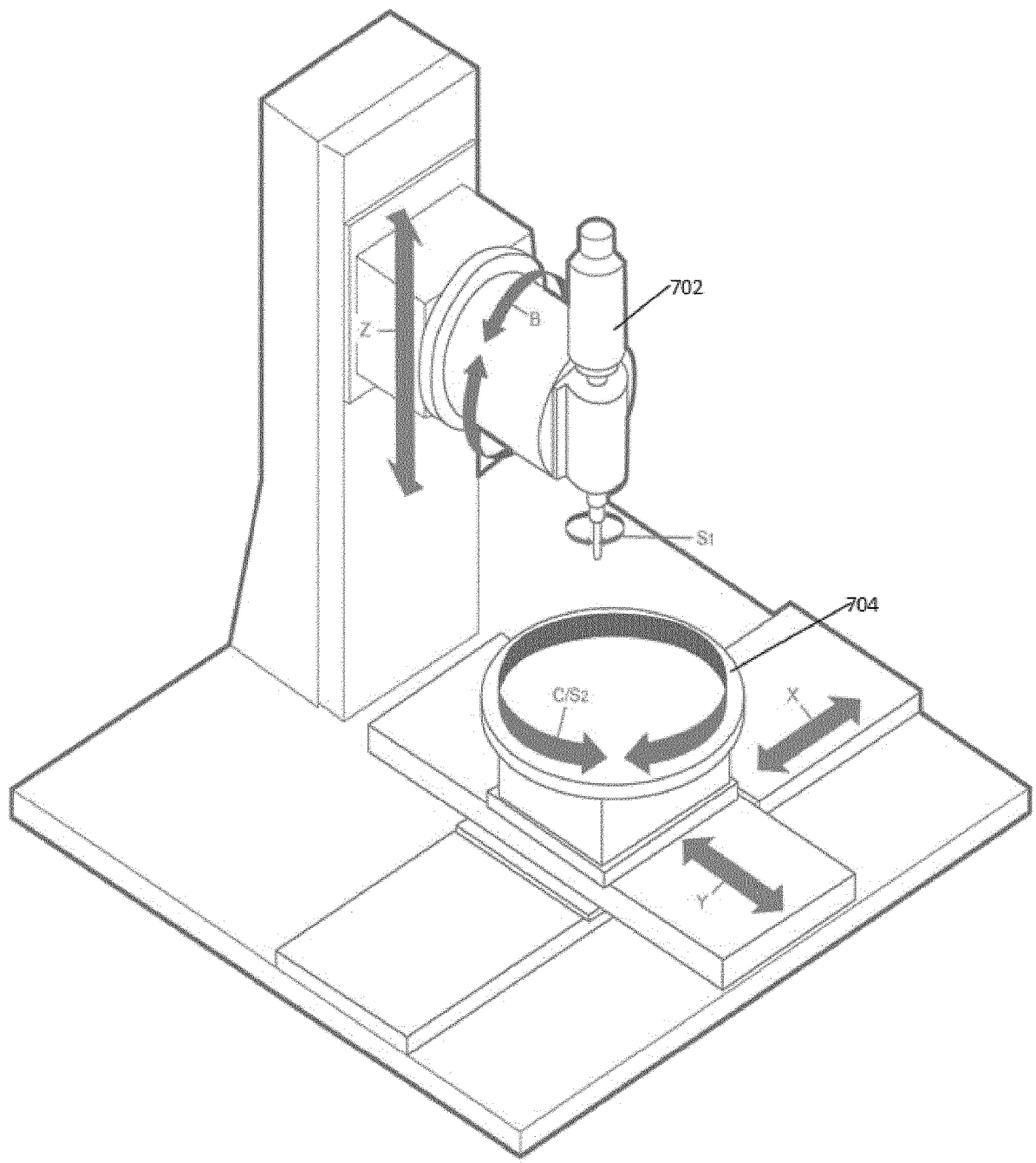
FIG. 7 illustrates an example of 5-axis milling machine.

FIG. 7 illustrates an example of a 5-axis milling machine, wherein 702 is a tool spindle and 704 is a workpiece. An example of a data signal layout for the 5-axis milling machine is also shown in Table 19-20. The kinematic structure of this machine includes a workpiece with two linear axes (X, Y) and one rotary axis (C/S2), and a spindle (S1), with one linear axis (Z) and one rotary axis (B).

The rotary axis (C/S2) can change functions between position mode and speed mode. The position mode and speed mode share the same real-time output signal in default machine configurations. It is possible to set the two modes to two separate real-time output signals if this is required by the machine tool manufacturer. This example machine uses two separate signals for position mode and speed mode as seen in axis C and spindle S2. This example machine outputs feed power [W].

TABLE 19

Layout of data signals from a 5-axis milling machine

| Address offset | Data signal name | Description |
| --- | --- | --- |
| n + [00 . . . 03] | FrMachInfo01 | Machine information |
| n + [04 . . . 07] | FrMachInfo02 | |
| n + [08 . . . 11] | FrMachAck01 | ACK action acknowledge from machine: Channel 1 |
| n + [12 . . . 15] | FrMachAckType01 | ACK action type from machine: Channel 1 |
| n + [16 . . . 19] | FrMachAckValue01 | ACK action value from machine: Channel 1 |
| n + [20 . . . 23] | FrMachType01 | Not ACK action type from machine: Channel 1 |
| n + [24 . . . 27] | FrMachValue01 | Not ACK action value from machine: Channel 1 |
| n + [28 . . . 31] | FrMachFeed01 | Actual cutting feed rate: Channel 1 |
| n + [32 . . . 35] | FrMachPosSpe01 | Position: Axis X |
| n + [36 . . . 39] | FrMachPosSpe02 | Position: Axis Y |
| n + [40 . . . 43] | FrMachPosSpe03 | Position: Axis Z |
| n + [44 . . . 47] | FrMachPosSpe04 | Position: Axis B |
| n + [48 . . . 51] | FrMachPosSpe05 | Speed: Spindle $S_1$ |
| n + [52 . . . 55] | FrMachPosSpe06 | Position: Axis C |
| n + [56 . . . 59] | FrMachPosSpe07 | Speed: Spindle $S_2$ |
| n + [60 . . . 63] | FrMachLPT01M01 | Feed power: Axis X, Motor 1 |
| n + [64 . . . 67] | FrMachLPT02M01 | Feed power: Axis Y, Motor 1 |
| n + [68 . . . 71] | FrMachLPT03M01 | Feed power: Axis Z, Motor 1 |
| n + [72 . . . 75] | FrMachLPT04M01 | Feed power: Axis B, Motor 1 |
| n + [76 . . . 79] | FrMachLPT05M01 | Feed power: Spindle $S_1$, Motor 1 |
| n + [80 . . . 83] | FrMachLPT06M01 | Feed power: Axis C and Spindle $S_2$, Motor 1 |

TABLE 20

Layout of data signals to a 5-axis milling machine

| Address offset | Data signal name | Description |
| --- | --- | --- |
| n + [00 . . . 03] | ToMachAck01 | ACK action acknowledge to machine: Channel 1 |
| n + [04 . . . 07] | ToMachAckType01 | ACK action type to machine: Channel 1 |
| n + [08 . . . 11] | ToMachAckValue01 | ACK action value to machine: Channel 1 |
| n + [12 . . . 15] | ToMachType01 | Not ACK action type to machine: Channel 1 |
| n + [16 . . . 19] | ToMachValue01 | Not ACK action value to machine: Channel 1 |
| n + [20 . . . 23] | ToMachFeedMul01 | Multiplicator cutting feed rate: Channel 1 |
| n + [24 . . . 27] | ToMachSpeedMul01 | Multiplicator spindle speed: Spindle $S_1$ |
| n + [28 . . . 31] | ToMachSpeedMul02 | Multiplicator spindle speed: Spindle $S_2$ |

Figure 8:
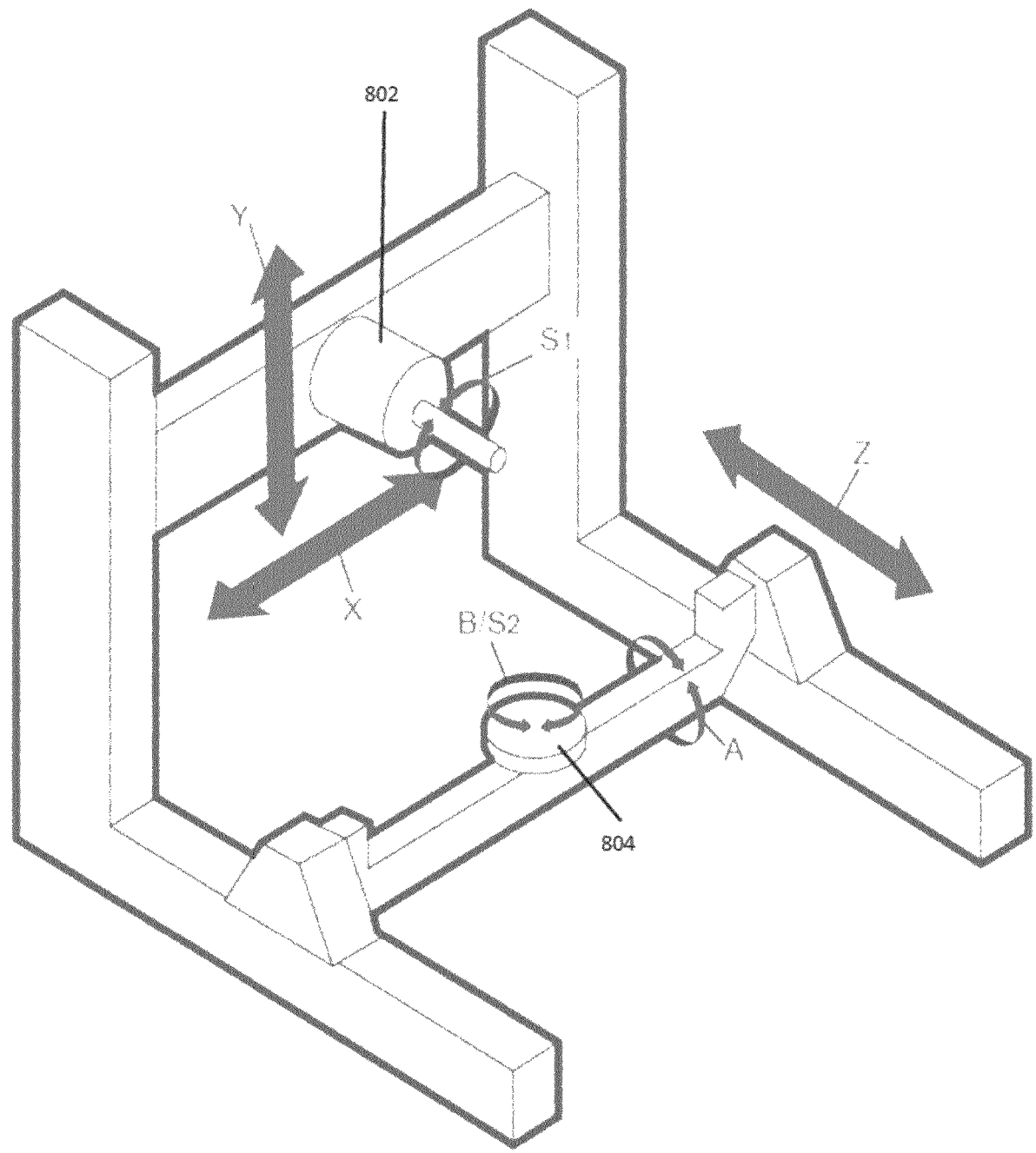
FIG. 8 illustrates another example of 5-axis milling machine.

FIG. 8 illustrates another example of a 5-axis milling machine, wherein 802 is a tool spindle and 804 is a workpiece. Another example of a data signal layout for the 5-axis milling machine is also shown in Table 21-22. The kinematic structure of this machine includes a workpiece with one linear axis (Z) and two rotary axes (A, B/S2), and a spindle (S1) with two linear axes (X, Y).

The rotary axis (B/S2) can change functions between position mode and speed mode. This example machine outputs feed torque [N-m].

TABLE 21

Layout of data signals from a 5-axis milling machine

| Address offset | Data signal name | Description |
|---|---|---|
| n + [00 ... 03] | FrMachInfo01 | Machine information |
| n + [04 ... 07] | FrMachInfo02 | |
| n + [08 ... 11] | FrMachAck01 | ACK action acknowledge from machine: Channel 1 |
| n + [12 ... 15] | FrMachAckType01 | ACK action type from machine: Channel 1 |
| n + [16 ... 19] | FrMachAckValue01 | ACK action value from machine: Channel 1 |
| n + [20 ... 23] | FrMachType01 | Not ACK action type from machine: Channel 1 |
| n + [24 ... 27] | FrMachValue01 | Not ACK action value from machine: Channel 1 |
| n + [28 ... 31] | FrMachFeed01 | Actual cutting feed rate: Channel 1 |
| n + [32 ... 35] | FrMachPosSpe01 | Position: Axis X |
| n + [36 ... 39] | FrMachPosSpe02 | Position: Axis Y |
| n + [40 ... 43] | FrMachPosSpe03 | Position: Axis Z |
| n + [44 ... 47] | FrMachPosSpe04 | Position: Axis A |
| n + [48 ... 51] | FrMachPosSpe05 | Speed: Spindle $S_1$ |
| n + [52 ... 55] | FrMachPosSpe06 | Position or speed: Axis B or spindle $S_2$ |
| n + [56 ... 59] | FrMachLPT01M01 | Feed torque: Axis X, Motor 1 |
| n + [60 ... 63] | FrMachLPT02M01 | Feed torque: Axis Y, Motor 1 |
| n + [64 ... 67] | FrMachLPT03M01 | Feed torque: Axis Z, Motor 1 |
| n + [68 ... 71] | FrMachLPT04M01 | Feed torque: Axis A, Motor 1 |
| n + [72 ... 75] | FrMachLPT05M01 | Feed torque: Spindle $S_1$, Motor 1 |
| n + [76 ... 79] | FrMachLPT06M01 | Feed torque: Axis B and spindle $S_2$, Motor 1 |

TABLE 22

Layout of data signals to a 5-axis milling machine

| Address offset | Data signal name | Description |
|---|---|---|
| n + [00 ... 03] | ToMachAck01 | ACK action acknowledge to machine: Channel 1 |
| n + [04 ... 07] | ToMachAckType01 | ACK action type to machine: Channel 1 |
| n + [08 ... 11] | ToMachAckValue01 | ACK action value to machine: Channel 1 |
| n + [12 ... 15] | ToMachType01 | Not ACK action type to machine: Channel 1 |
| n + [16 ... 19] | ToMachValue01 | Not ACK action value to machine: Channel 1 |
| n + [20 ... 23] | ToMachFeedMul01 | Multiplicator cutting feed rate: Channel 1 |
| n + [24 ... 27] | ToMachSpeedMul01 | Multiplicator spindle speed: Spindle $S_1$ |
| n + [28 ... 31] | ToMachSpeedMul02 | Multiplicator spindle speed: Spindle $S_2$ |

Figure 9:
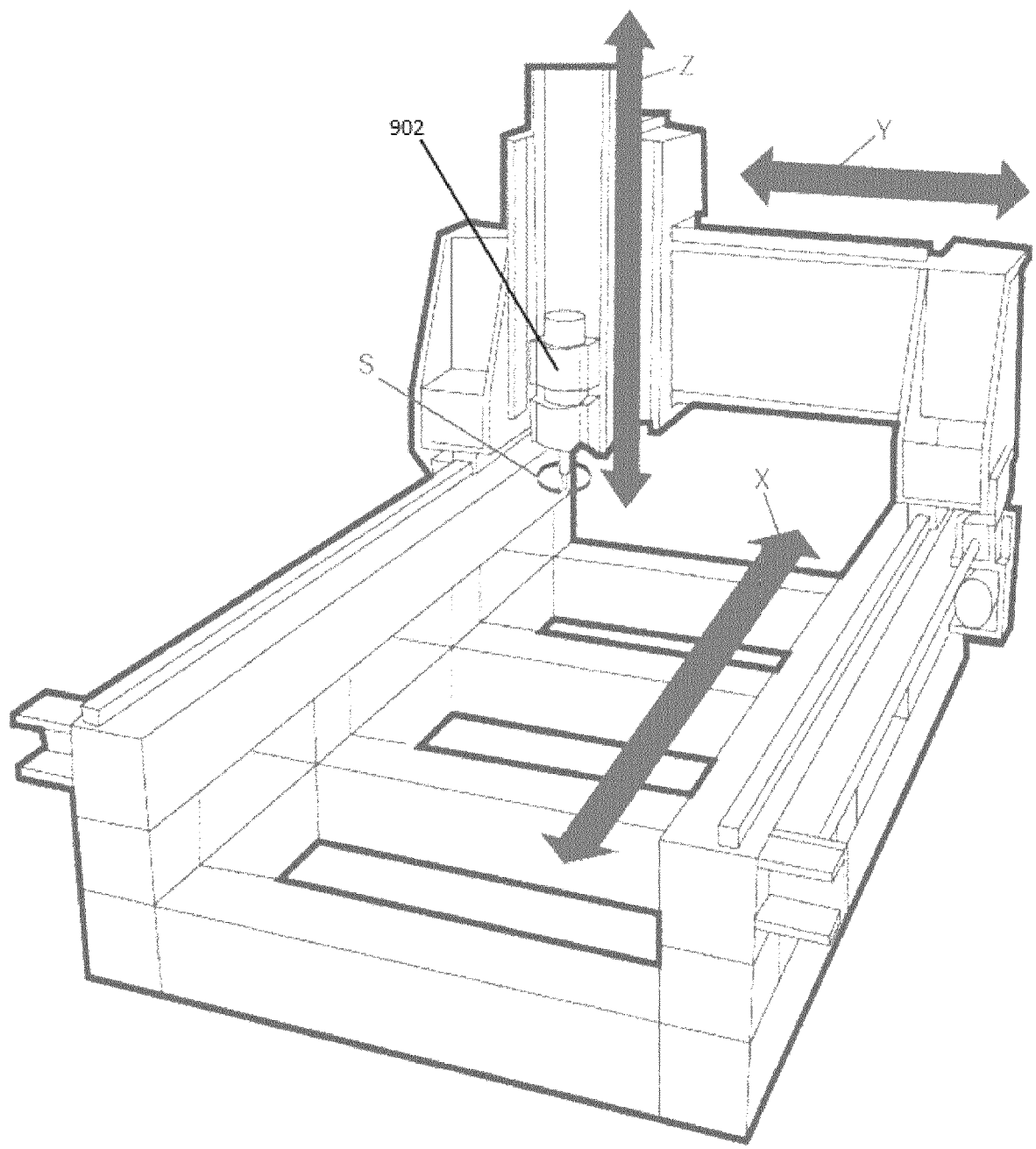
FIG. 9 illustrates an example of 3-axis gantry milling machine.

FIG. 9 illustrates an example of a 3-axis gantry milling machine, wherein 902 is tool spindle. An example of a data signal layout for the 3-axis gantry milling machine is also shown in Table 23-24. The kinematic structure of this machine includes a stationary workpiece and a spindle (S) with three linear axes (X, Y, Z).

Movement in the X axis is driven by two separate motors which requires separate load/power/torque data signals. This example machine outputs feed load [%].

TABLE 23

Layout of data signals from a 3-axis gantry milling machine

| Address offset | Data signal name | Description |
|---|---|---|
| n + [00 ... 03] | FrMachInfo01 | Machine information |
| n + [04 ... 07] | FrMachInfo02 | |
| n + [08 ... 11] | FrMachAck01 | ACK action acknowledge from machine: Channel 1 |
| n + [12 ... 15] | FrMachAckType01 | ACK action type from machine: Channel 1 |
| n + [16 ... 19] | FrMachAckValue01 | ACK action value from machine: Channel 1 |
| n + [20 ... 23] | FrMachType01 | Not ACK action type from machine: Channel 1 |
| n + [24 ... 27] | FrMachValue01 | Not ACK action value from machine: Channel 1 |
| n + [28 ... 31] | FrMachFeed01 | Actual cutting feed rate: Channel 1 |
| n + [32 ... 35] | FrMachPosSpe01 | Position: Axis X |
| n + [36 ... 39] | FrMachPosSpe02 | Position: Axis Y |
| n + [40 ... 43] | FrMachPosSpe03 | Position: Axis Z |
| n + [44 ... 47] | FrMachPosSpe04 | Speed: Spindle S |
| n + [48 ... 51] | FrMachLPT01M01 | Feed load: Axis X, Motor 1 |
| n + [52 ... 55] | FrMachLPT01M02 | Feed load: Axis X, Motor 2 |
| n + [56 ... 59] | FrMachLPT02M01 | Feed load: Axis Y, Motor 1 |
| n + [60 ... 63] | FrMachLPT03M01 | Feed load: Axis Z, Motor 1 |
| n + [64 ... 67] | FrMachLPT04M01 | Feed load: Spindle S, Motor 1 |

TABLE 24

Layout of data signals to a 3-axis gantry milling machine

| Address offset | Data signal name | Description |
|---|---|---|
| n + [00 . . . 03] | ToMachAck01 | ACK action acknowledge to machine: Channel 1 |
| n + [04 . . . 07] | ToMachAckType01 | ACK action type to machine: Channel 1 |
| n + [08 . . . 11] | ToMachAckValue01 | ACK action value to machine: Channel 1 |
| n + [12 . . . 15] | ToMachType01 | Not ACK action type to machine: Channel 1 |
| n + [16 . . . 19] | ToMachValue01 | Not ACK action value to machine: Channel 1 |
| n + [20 . . . 23] | ToMachFeedMul01 | Multiplicator cutting feed rate: Channel 1 |
| n + [24 . . . 27] | ToMachSpeedMul01 | Multiplicator spindle speed: Spindle S |

Figure 10:
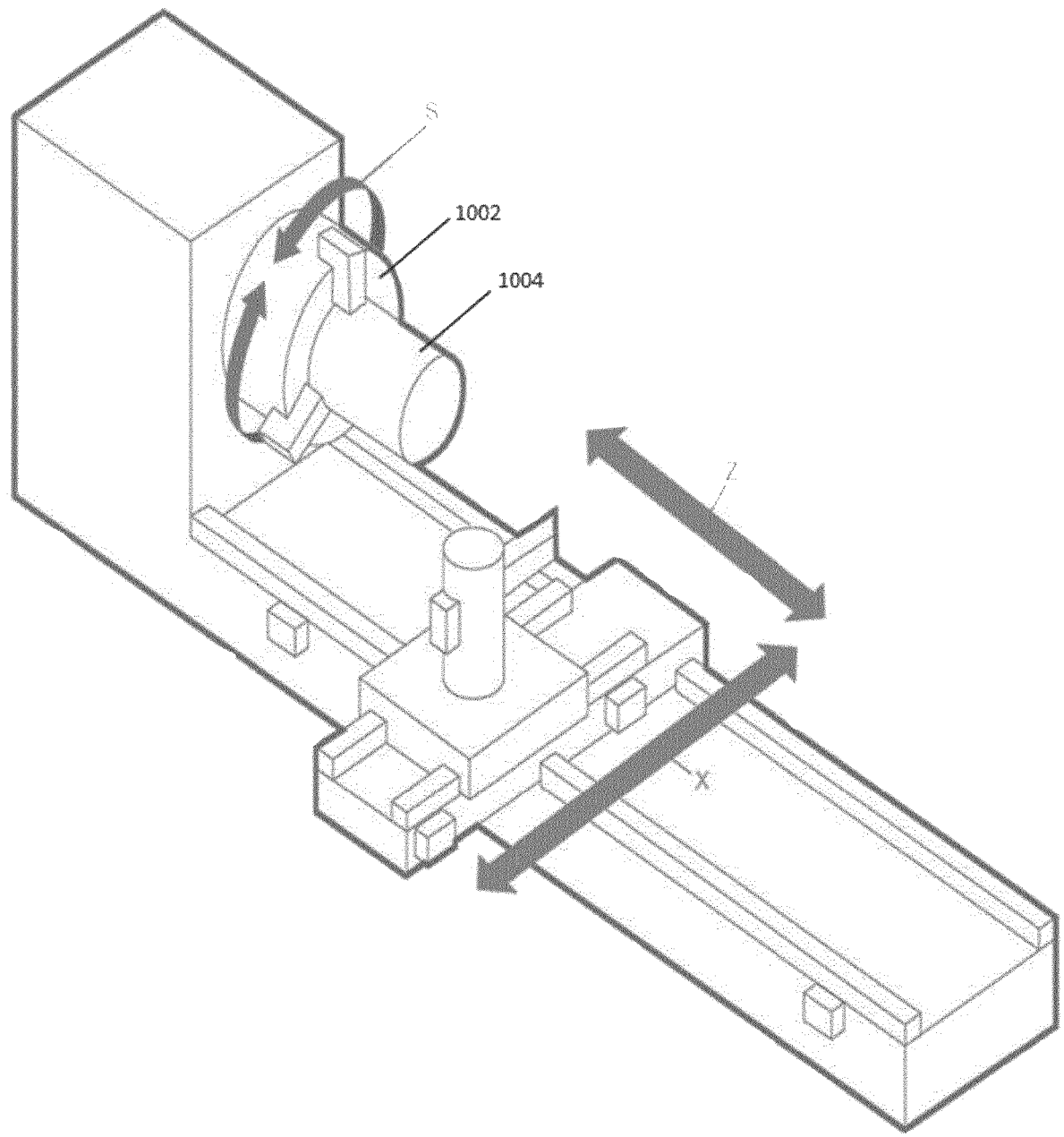
FIG. 10 illustrates an example of 2-axis turning machine.

FIG. 10 illustrates an example of a 2-axis turning machine, wherein 1002 is a workpiece spindle and 1004 is a workpiece. An example of a data signal layout for the 2-axis turning machine is also shown in Table 25-26. The kinematic structure of this machine includes a workpiece in a spindle (S) and a tool with two linear axes (X, Z).

This example machine outputs feed power [W].

TABLE 25

Layout of data signals from a 2-axis turning machine

| Address offset | Data signal name | Description |
|---|---|---|
| n + [00 . . . 03] | FrMachInfo01 | Machine information |
| n + [04 . . . 07] | FrMachInfo02 | |
| n + [08 . . . 11] | FrMachAck01 | ACK action acknowledge from machine: Channel 1 |
| n + [12 . . . 15] | FrMachAckType01 | ACK action type from machine: Channel 1 |
| n + [16 . . . 19] | FrMachAckValue01 | ACK action value from machine: Channel 1 |
| n + [20 . . . 23] | FrMachType01 | Not ACK action type from machine: Channel 1 |
| n + [24 . . . 27] | FrMachValue01 | Not ACK action value from machine: Channel 1 |
| n + [28 . . . 31] | FrMachFeed01 | Actual cutting feed rate: Channel 1 |
| n + [32 . . . 35] | FrMachPosSpe01 | Position: Axis X |
| n + [36 . . . 39] | FrMachPosSpe02 | Position: Axis Z |
| n + [40 . . . 43] | FrMachPosSpe03 | Speed: Spindle S |
| n + [44 . . . 47] | FrMachLPT01M01 | Feed power: Axis X, Motor 1 |
| n + [48 . . . 51] | FrMachLPT02M01 | Feed power: Axis Z, Motor 1 |
| n + [52 . . . 55] | FrMachLPT03M01 | Feed power: Spindle S, Motor 1 |

TABLE 26

Layout of data signals to a 2-axis turning machine

| Address offset | Data signal name | Description |
|---|---|---|
| n + [00 . . . 03] | ToMachAck01 | ACK action acknowledge to machine: Channel 1 |
| n + [04 . . . 07] | ToMachAckType01 | ACK action type to machine: Channel 1 |
| n + [08 . . . 11] | ToMachAckValue01 | ACK action value to machine: Channel 1 |
| n + [12 . . . 15] | ToMachType01 | Not ACK action type to machine: Channel 1 |
| n + [16 . . . 19] | ToMachValue01 | Not ACK action value to machine: Channel 1 |
| n + [20 . . . 23] | ToMachFeedMul01 | Multiplicator cutting feed rate: Channel 1 |
| n + [24 . . . 27] | ToMachSpeedMul01 | Multiplicator spindle speed: Spindle S |

Figure 11:
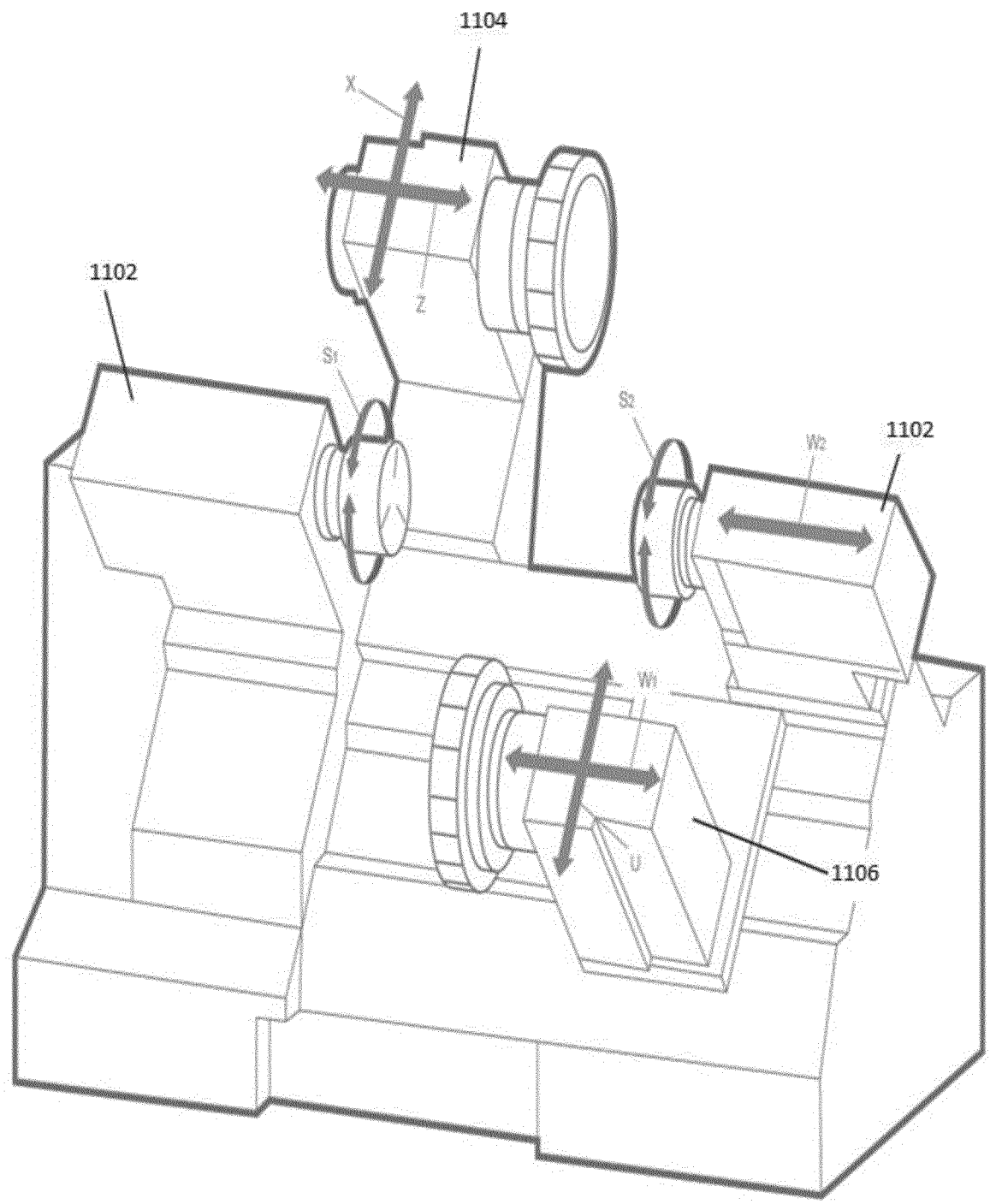
FIG. 11 illustrates an example of 4-axis, 2-spindle, 2-channel turning machine.

FIG. 11 illustrates an example of a 4-axis, 2 spindles, 2 channels turning machine, wherein 1102 is workpiece spindle and 1104 and 1106 are tool turrets. An example of a data signal layout for the 4-axis, 2 spindles, 2 channels turning machine is also shown in Table 27-28. The kinematic structure of this machine includes two tool turrets with two linear axes (X, Z and U, W1) each and two workpiece spindles where one is a stationary spindle (S1) and one is a spindle (S2) with a linear axis (W2).

This example machine outputs feed torque [N-m].

TABLE 27

Layout of data signals from a 4-axis, 2 spindles, 2 channels turning machine

| Address offset | Data signal name | Description |
|---|---|---|
| n + [00 . . . 03] | FrMachInfo01 | Machine information |
| n + [04 . . . 07] | FrMachInfo02 | |
| n + [08 . . . 11] | FrMachAck01 | ACK action acknowledge from machine: Channel 1 |
| n + [12 . . . 15] | FrMachAckType01 | ACK action type from machine: Channel 1 |
| n + [16 . . . 19] | FrMachAckValue01 | ACK action value from machine: Channel 1 |
| n + [20 . . . 23] | FrMachType01 | Not ACK action type from machine: Channel 1 |
| n + [24 . . . 27] | FrMachValue01 | Not ACK action value from machine: Channel 1 |
| n + [28 . . . 31] | FrMachAck02 | ACK action acknowledge from machine: Channel 2 |
| n + [32 . . . 35] | FrMachAckType02 | ACK action type from machine: Channel 2 |
| n + [36 . . . 39] | FrMachAckValue02 | ACK action value from machine: Channel 2 |
| n + [40 . . . 43] | FrMachType02 | Not ACK action type from machine: Channel 2 |
| n + [44 . . . 47] | FrMachValue02 | Not ACK action value from machine: Channel 2 |
| n + [48 . . . 51] | FrMachFeed01 | Actual cutting feed rate: Channel 2 |
| n + [52 . . . 55] | FrMachFeed02 | Actual cutting feed rate: Channel 2 |
| n + [56 . . . 59] | FrMachPosSpe01 | Position: Axis X |
| n + [60 . . . 63] | FrMachPosSpe02 | Position: Axis Z |
| n + [64 . . . 67] | FrMachPosSpe03 | Position: Axis U |
| n + [68 . . . 71] | FrMachPosSpe04 | Position: Axis $W_1$ |
| n + [72 . . . 75] | FrMachPosSpe05 | Position: Axis $W_2$ |
| n + [76 . . . 79] | FrMachPosSpe06 | Speed: Spindle $S_1$ |
| n + [80 . . . 83] | FrMachPosSpe07 | Speed: Spindle $S_2$ |
| n + [84 . . . 87] | FrMachLPT01M01 | Feed torque: Axis X, Motor 1 |
| n + [88 . . . 91] | FrMachLPT02M01 | Feed torque: Axis Z, Motor 1 |
| n + [92 . . . 95] | FrMachLPT03M01 | Feed torque: Axis U, Motor 1 |
| n + [96 . . . 99] | FrMachLPT04M01 | Feed torque: Axis $W_1$, Motor 1 |
| n + [100 . . . 103] | FrMachLPT05M01 | Feed torque: Axis $W_2$, Motor 1 |
| n + [104 . . . 107] | FrMachLPT06M01 | Feed torque: Spindle $S_1$, Motor 1 |
| n + [108 . . . 111] | FrMachLPT07M01 | Feed torque: Spindle $S_2$, Motor 1 |

TABLE 28

Layout of data signals to a 4-axis, 2 spindles, 2 channels turning machine

| Address offset | Data signal name | Description |
|---|---|---|
| n + [00 . . . 03] | ToMachAck01 | ACK action acknowledge to machine: Channel 1 |
| n + [04 . . . 07] | ToMachAckType01 | ACK action type to machine: Channel 1 |
| n + [08 . . . 11] | ToMachAckValue01 | ACK action value to machine: Channel 1 |
| n + [12 . . . 15] | ToMachType01 | Not ACK action type to machine: Channel 1 |
| n + [16 . . . 19] | ToMachValue01 | Not ACK action value to machine: Channel 1 |
| n + [20 . . . 23] | ToMachFeedMul01 | Multiplicator cutting feed rate: Channel 1 |
| n + [24 . . . 27] | ToMachSpeedMul01 | Multiplicator spindle speed: Spindle $S_1$ |
| n + [28 . . . 31] | ToMachAck02 | ACK action acknow ledge to machine: Channel 2 |
| n + [32 . . . 35] | ToMachAckType02 | ACK action type to machine: Channel 2 |
| n + [36 . . . 39] | ToMachAckValue02 | ACK action value to machine: Channel 2 |
| n + [40 . . . 43] | ToMachType02 | Not ACK action type to machine: Channel 2 |
| n + [44 . . . 47] | ToMachValue02 | Not ACK action value to machine: Channel 2 |
| n + [48 . . . 51] | ToMachFeedMul02 | Mulliplicator cutting feed rate: Channel 2 |
| n + [52 . . . 55] | ToMachSpeedMul02 | Mulliplicator spindle speed: Spindle $S_2$ |

Figure 12:
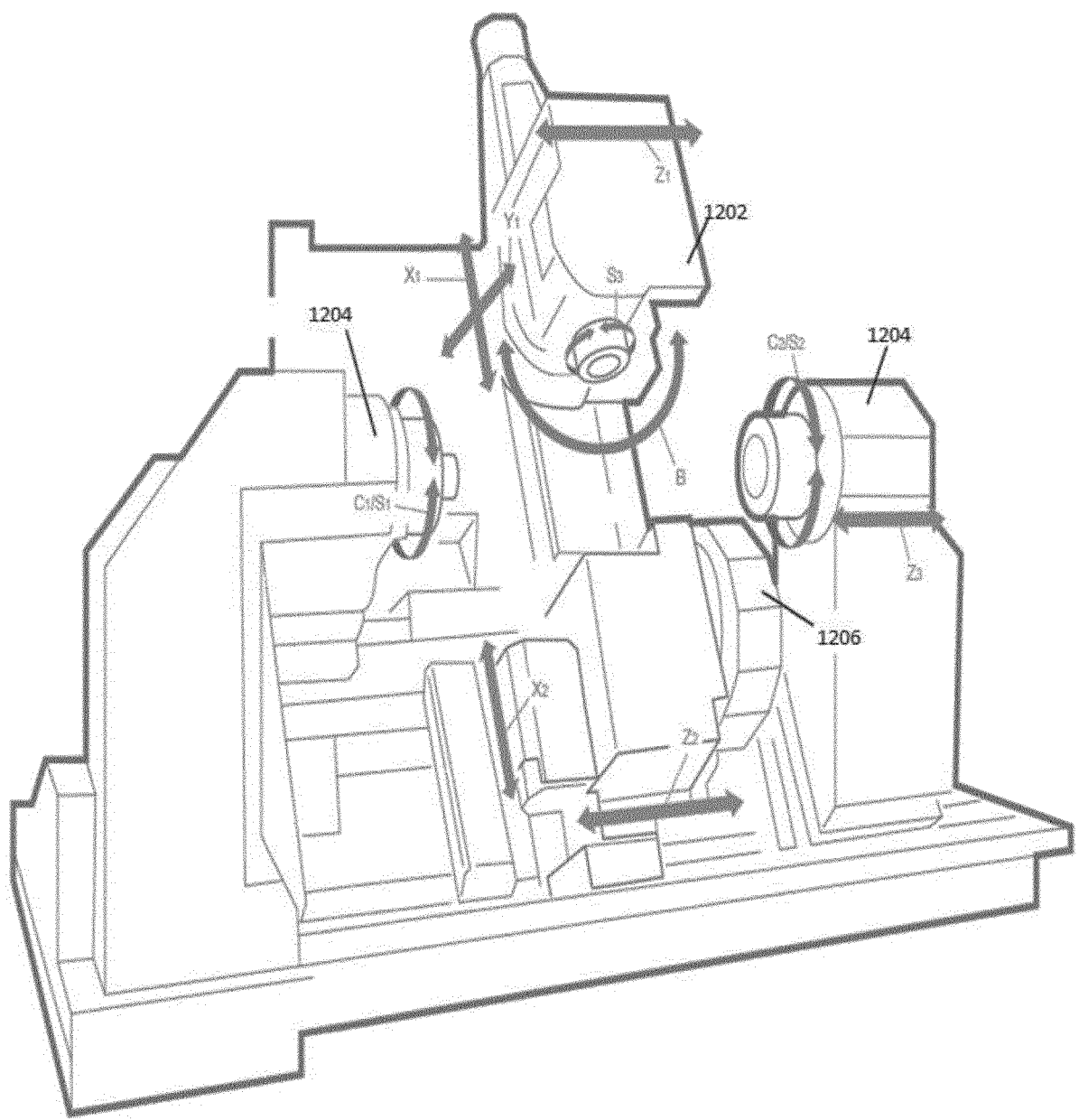
FIG. 12 illustrates an example of multitask TurnMill machine.

FIG. 12 illustrates an example of a multitask TurnMill machine, wherein 1202 is tool spindle, 1204 is workpiece spindle and 1206 is tool turret. An example of a data signal layout for the multitask TurnMill machine is also shown in Table 29-30. The kinematic structure of this machine includes a tool spindle (S3) with three linear axes (X, Y1, Z1) and a rotary axis (B), one tool turret with two linear axes (X2, Z2), two workpiece spindles with rotary axes (C1/S1, C2/S2) with a linear axis (Z3).

The two rotary axes (C1/S1, C2/S2) can change functions between position mode and speed mode. This example machine outputs feed load [%].

TABLE 29

Layout of data signals from a multitask TurnMill machine

| Address offset | Data signal name | Description |
|---|---|---|
| n + [00 . . . 03] | FrMachInfo01 | Machine information |
| n + [04 . . . 07] | FrMachInfo02 | |
| n + [08 . . . 11] | FrMachAck01 | ACK action acknowledge from machine: Channel 1 |
| n + [12 . . . 15] | FrMachAckType01 | ACK action type from machine: Channel 1 |
| n + [16 . . . 19] | FrMachAckValue01 | ACK action value from machine: Channel 1 |
| n + [20 . . . 23] | FrMachType01 | Not ACK action type from machine: Channel 1 |
| n + [24 . . . 27] | FrMachValue01 | Not ACK action value from machine: Channel 1 |
| n + [28 . . . 31] | FrMachAck02 | ACK action acknowledge from machine: Channel 2 |
| n + [32 . . . 35] | FrMachAckType02 | ACK action type from machine: Channel 2 |
| n + [36 . . . 39] | FrMachAckValue02 | ACK action value from machine: Channel 2 |
| n + [40 . . . 43] | FrMachType02 | Not ACK action type from machine: Channel 2 |
| n + [44 . . . 47] | FrMachValue02 | Not ACK action value from machine: Channel 2 |
| n + [48 . . . 51] | FrMachFeed01 | Actual cutting feed rate: Channel 1 |
| n + [52 . . . 55] | FrMachFeed02 | Actual cutting feed rate: Channel 2 |
| n + [56 . . . 59] | FrMachPosSpe01 | Position: Axis $X_1$ |
| n + [60 . . . 63] | FrMachPosSpe02 | Position: Axis $Y_1$ |
| n + [64 . . . 67] | FrMachPosSpe03 | Position: Axis $Z_1$ |
| n + [68 . . . 71] | FrMachPosSpe04 | Position: Axis $X_2$ |
| n + [72 . . . 75] | FrMachPosSpe05 | Position: Axis $Z_2$ |
| n + [76 . . . 79] | FrMachPosSpe06 | Position: Axis $Z_3$ |
| n + [80 . . . 83] | FrMachPosSpe07 | Position: Axis B |
| n + [84 . . . 87] | FrMachPosSpe08 | Position or speed: Axis $C_1$ or spindle $S_1$ |
| n + [88 . . . 91] | FrMachPosSpe09 | Position or speed: Axis $C_2$ or spindle $S_2$ |
| n + [92 . . . 95] | FrMachPosSpe10 | Speed: Spindle $S_3$ |
| n + [96 . . . 99] | FrMachLPT01M01 | Feed load: Axis $X_1$, Motor 1 |
| n + [100 . . . 103] | FrMachLPT02M01 | Feed load: Axis $Y_1$, Motor 1 |
| n + [104 . . . 107] | FrMachLPT03M01 | Feed load: Axis $Z_1$, Motor 1 |
| n + [108 . . . 111] | FrMachLPT04M01 | Feed load: Axis B, Motor 1 |
| n + [112 . . . 115] | FrMachLPT05M01 | Feed load: Axis $C_1$ and spindle $S_1$, Motor 1 |
| n + [116 . . . 119] | FrMachLPT06M01 | Feed load: Axis $X_2$, Motor 1 |
| n + [120 . . . 123] | FrMachLPT07M01 | Feed load: Axis $Z_2$, Motor 1 |
| n + [124 . . . 127] | FrMachLPT08M01 | Feed load: Axis $Z_3$, Motor 1 |
| n + [128 . . . 131] | FrMachLPT09M01 | Feed load: Axis $C_2$ and spindle $S_2$, Motor 1 |
| n + [132 . . . 135] | FrMachLPT10M01 | Feed load: Spindle $S_3$, Motor 1 |

TABLE 30

Layout of data signals to a multitask TurnMill machine

| Address offset | Data signal name | Description |
|---|---|---|
| n + [00 . . . 03] | ToMachAck01 | ACK action acknowledge to machine: Channel 1 |
| n + [04 . . . 07] | ToMachAckType01 | ACK action type to machine: Channel 1 |
| n + [08 . . . 11] | ToMachAckValue01 | ACK action value to machine: Channel 1 |
| n + [12 . . . 15] | ToMachType01 | Not ACK action type to machine: Channel 1 |
| n + [16 . . . 19] | ToMachValue01 | Not ACK action value to machine: Channel 1 |
| n + [20 . . . 23] | ToMachFeedMul01 | Multiplicator cutting feed rate: Channel 1 |
| n + [24 . . . 27] | ToMachSpeedMul01 | Multiplicator spindle speed: Spindle S1 |
| n + [28 . . . 31] | ToMachAck02 | ACK action acknowledge to machine: Channel 2 |
| n + [32 . . . 35] | ToMachAckType02 | ACK action type to machine: Channel 2 |
| n + [36 . . . 39] | ToMachAckValue02 | ACK action value to machine: Channel 2 |
| n + [40 . . . 43] | ToMachType02 | Not ACK action type to machine: Channel 2 |
| n + [44 . . . 47] | ToMachValue02 | Not ACK action value to machine: Channel 2 |
| n + [48 . . . 51] | ToMachFeedMul02 | Multiplicator cutting feed rate: Channel 2 |

TABLE 30-continued

Layout of data signals to a multitask TurnMill machine

| Address offset | Data signal name | Description |
|---|---|---|
| n + [52 . . . 55] | ToMachSpeedMul02 | Multiplicator spindle speed: Spindle $S_2$ |
| n + [56 . . . 59] | ToMachSpeedMul03 | Multiplicator spindle speed: Spindle $S_3$ |

Figure 13:
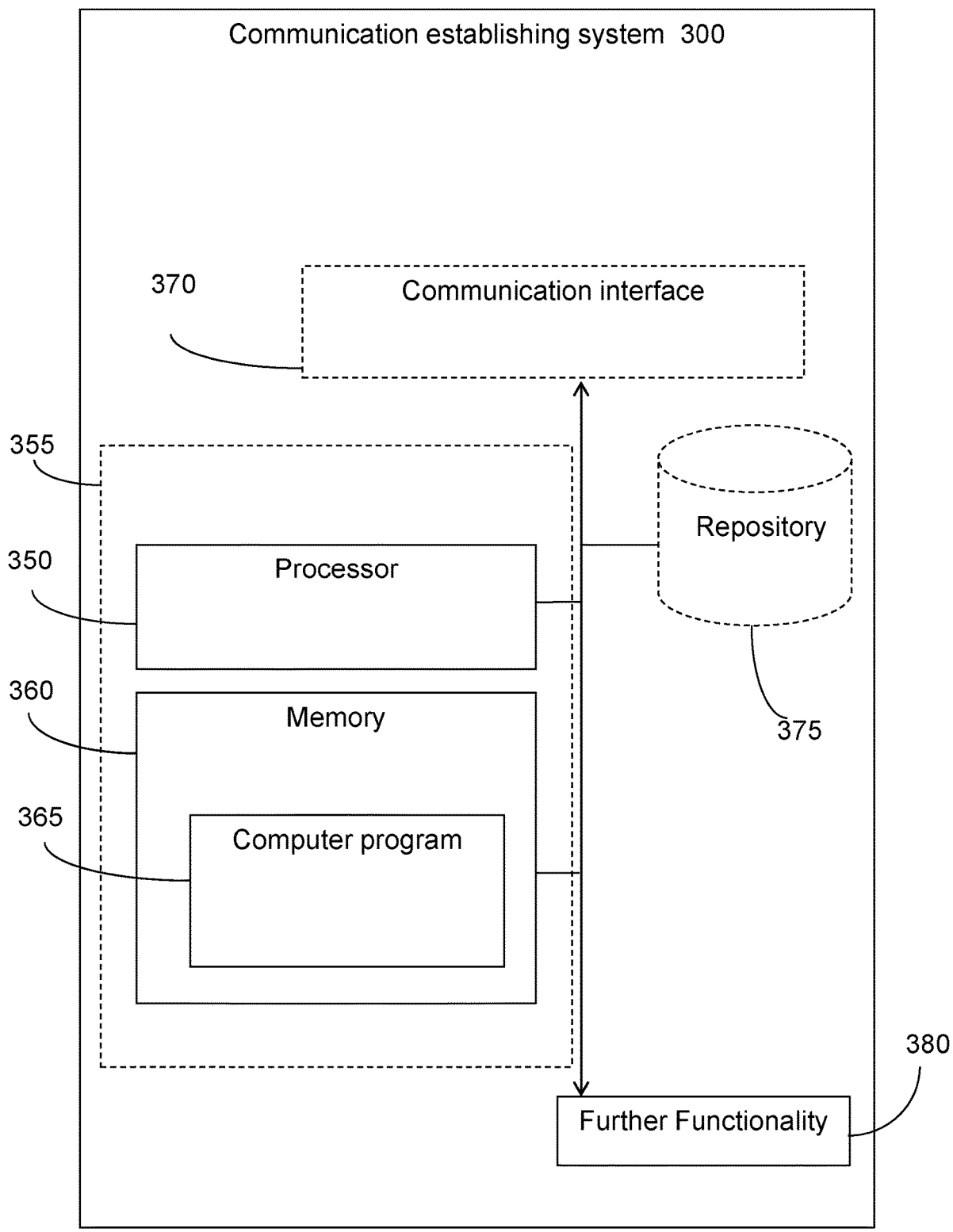
FIG. 13 illustrates an exemplary communication establishing system implementing the method of establishing communication shown in FIG. 4.

With reference to FIG. 13 a communication establishing system 300 is shown. The system may comprise a communication interface 370, which may be considered to comprise conventional means for communicating from and/or to the other devices in the network, such as Control node 100, PLC 102 and NC 104 or other devices or nodes in a communication network. The conventional communication means may include at least one transmitter and at least one receiver. The communication interface may further comprise one or more repository 375 and further functionality useful for the communication establishing system 300 to serve its purpose as an apparatus for establishing the communication between the control node 100 and the machine tool system 10.

The instructions executable by a processor 350 may be arranged as a computer program 365 stored in said at least one memory 360. The at least one processor 350 and the at least one memory 360 may be arranged in an arrangement 355. The arrangement 355 may be a microprocessor and adequate software and storage therefor, a Programmable Logic Device, PLD, or other electronic component(s)/processing circuit(s) configured to perform the actions, or methods, mentioned above.

The computer program 365 may comprise computer readable code means which, when run in the system, causes the communication establishing system 300 to perform the steps described in the method described in relation to FIG. 4. The computer program may be carried by a computer readable storage medium connectable to the at least one processor. The computer readable storage medium may be the at least one memory 360. The at least one memory 360 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the at least one memory 360.

Although the instructions described in the embodiments disclosed above are implemented as a computer program 365 to be executed by the at least one processor 350 at least one of the instructions may in alternative embodiments be implemented at least partly as hardware circuits. Alternatively, the computer program may be stored on a server or any other entity connected to the communications network to which the control node 100 has access via its communications interface 370. The computer program may than be downloaded from the server into the at least one memory 360, carried by an electronic signal, optical signal, or radio signal.

It will be appreciated that additional advantages and modifications will readily occur to those skilled in the art. Therefore, the disclosures presented herein, and broader aspects thereof are not limited to the specific details and representative embodiments shown and described herein. Accordingly, many modifications, equivalents, and improvements may be included without departing from the spirit or scope of the general inventive concept as defined by the appended claims and their equivalents.

The invention claimed is:

1. A method for establishing communication between a control node and a machine in a machine tool system, comprising the steps of:
   notifying the control node of an identifier of the machine, said machine including a numerical control;
   retrieving a machine configuration file including machine attributes at the control node based on the identifier, wherein the machine configuration file is an extensible markup language (XML) file;
   determining a data structure for a data signal transferring information in the machine tool system by interpreting the machine configuration file; and
   acknowledging from the control node to the machine that the communication has been established.

2. The method according to claim 1, wherein the machine further comprises a programmable logic controller.

3. The method according to claim 2, wherein the identifier of the machine is generated based on which version of a programmable logic controller interface that is installed in the machine, a manufacturer identification (ID) and serial number of the machine.

4. The method according to claim 1, wherein the configuration file includes at least one sub element including metadata for the machine and one sub element including a layout of the data signal.

5. The method according to claim 1, wherein the configuration file includes information indicating whether the data is sent in big- or little-endian byte order.

6. The method according to claim 1, wherein the acknowledging of the communication is a ping command.

7. An apparatus for establishing communication between a control node and a machine in a machine tool system, the apparatus comprising:
   a notifying unit configured to notify the control node of an identifier of the machine, said machine including a numerical control;
   a retrieving unit configured to retrieve a machine configuration file including machine attributes at the control node based on the identifier, wherein the machine configuration file is an extensible markup language (XML) file;
   a determining unit configured to determine a data structure for a data signal transferring information in the machine tool system, by interpreting the machine configuration file; and
   an acknowledging unit configured to acknowledge from the control node to the machine that the communication has been established.

8. The apparatus according to claim 7, wherein the machine includes a programmable logic controller.

9. The apparatus according to claim 8, wherein the identifier of the machine is generated based on which version of a programmable logic controller interface that is installed in the machine, a manufacturer identification (ID) and serial number of the machine.

10. The apparatus according to claim 7, wherein the configuration file includes at least one sub element including metadata for the machine and one sub element including a layout of the data signal.

11. The apparatus according to claim 7, wherein the configuration file includes information indicating whether the data is sent in big- or little-endian byte order.

12. The apparatus according to claim 7, wherein the acknowledging of the communication is a ping command.

13. A computer program product comprising a non-transitory storage medium including computer-readable instructions, which, when executed on a computer, performs a method according to claim 1.

* * * * *